United States Patent
Baghel et al.

(10) Patent No.: US 10,652,862 B2
(45) Date of Patent: May 12, 2020

(54) METHOD AND SYSTEM FOR CONNECTIONLESS TRANSMISSION DURING UPLINK AND DOWNLINK OF DATA PACKETS

(71) Applicant: Samsung Electronics Co., Ltd., Gyeonggi-do (KR)

(72) Inventors: Sudhir Kumar Baghel, Bangalore (IN); Rajavelsamy Rajadurai, Bangalore (IN); Venkateswara Rao Manepalli, Bangalore (IN); Mangesh Abhimanyu Ingale, Bangalore (IN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/411,772

(22) Filed: May 14, 2019

(65) Prior Publication Data
US 2019/0268882 A1    Aug. 29, 2019

Related U.S. Application Data

(63) Continuation of application No. 13/891,857, filed on May 10, 2013, now Pat. No. 10,306,596.

(30) Foreign Application Priority Data

May 10, 2012  (IN) .......................... 1863/CHE/2012
Sep. 10, 2012  (IN) .......................... 3756/CHE/2012

(51) Int. Cl.
*H04W 72/04* (2009.01)
*H04W 74/08* (2009.01)
(Continued)

(52) U.S. Cl.
CPC .......... *H04W 72/04* (2013.01); *H04L 63/123* (2013.01); *H04L 67/18* (2013.01); *H04W 12/001* (2019.01);
(Continued)

(58) Field of Classification Search
CPC ... H04W 76/022; H04W 80/02; H04W 12/02; H04W 28/06; H04W 36/0072;
(Continued)

(56) References Cited

U.S. PATENT DOCUMENTS

2004/0185837 A1   9/2004  Kim
2005/0013297 A1   1/2005  Eriksson
(Continued)

FOREIGN PATENT DOCUMENTS

| CN | 1823505 | 8/2006 |
|----|---------|--------|
| CN | 1852045 | 10/2006 |

(Continued)

OTHER PUBLICATIONS

Russian Office Action dated Dec. 20, 2016 issued in counterpart application No. 2014149712/08, 9 pages.
(Continued)

*Primary Examiner* — Oussama Roudani
(74) *Attorney, Agent, or Firm* — The Farrell Law Firm, P.C.

(57) ABSTRACT

A method and system for uplink-downlink transmission of message in a network. The method includes transmitting, by a user equipment (UE), to a radio access network (RAN) node, a random access channel (RACH) message including identifier information for identifying a serving gateway in a core network; receiving, by the UE, from the RAN node, a random access (RA) response message including uplink (UL) grant information; and transmitting, by the UE, to the RAN node, a data message including encrypted data in an idle mode. The data message is transmitted from the RAN node to the serving gateway based on the identifier information, and the encrypted data is generated by the UE, and the encrypted data is decrypted by the serving gateway.

20 Claims, 25 Drawing Sheets

(51) Int. Cl.
*H04L 29/06* (2006.01)
*H04W 76/12* (2018.01)
*H04L 29/08* (2006.01)
*H04W 12/00* (2009.01)
*H04W 12/10* (2009.01)
*H04W 12/04* (2009.01)
*H04W 88/16* (2009.01)
*H04W 40/02* (2009.01)
*H04W 12/02* (2009.01)

(52) U.S. Cl.
CPC ....... *H04W 74/0833* (2013.01); *H04W 76/12* (2018.02); *H04W 12/02* (2013.01); *H04W 12/04* (2013.01); *H04W 12/10* (2013.01); *H04W 40/02* (2013.01); *H04W 88/16* (2013.01); *Y02D 70/00* (2018.01); *Y02D 70/1224* (2018.01); *Y02D 70/1242* (2018.01); *Y02D 70/1262* (2018.01); *Y02D 70/21* (2018.01); *Y02D 70/24* (2018.01); *Y02D 70/30* (2018.01)

(58) Field of Classification Search
CPC . H04W 72/005; H04W 72/04; H04W 76/002; H04W 12/10; H04W 40/02; H04W 4/005; H04W 72/02; H04W 74/0833; H04W 76/046; H04W 88/16; H04L 12/189; H04L 65/4076; H04N 21/6131
See application file for complete search history.

(56) References Cited

U.S. PATENT DOCUMENTS

| | | | |
|---|---|---|---|
| 2007/0249352 A1 | 10/2007 | Song et al. | |
| 2008/0259889 A1 | 10/2008 | Wu | |
| 2009/0086698 A1 | 4/2009 | Roy et al. | |
| 2009/0104890 A1 | 4/2009 | Wang | |
| 2009/0316638 A1* | 12/2009 | Yi | H04W 74/002 370/329 |
| 2010/0095123 A1 | 4/2010 | He | |
| 2010/0316223 A1 | 12/2010 | Blom | |
| 2011/0085497 A1 | 4/2011 | Fang et al. | |
| 2011/0116464 A1 | 5/2011 | Ishii | |
| 2011/0199905 A1 | 8/2011 | Pinheiro | |
| 2012/0004003 A1* | 1/2012 | Shaheen | H04W 4/08 455/509 |
| 2012/0005746 A1* | 1/2012 | Wei | H04L 63/0272 726/15 |
| 2012/0093086 A1 | 4/2012 | Yin | |
| 2012/0163597 A1* | 6/2012 | Pan | H04L 9/0891 380/255 |
| 2012/0208545 A1* | 8/2012 | Yang | H04W 74/002 455/450 |
| 2012/0281566 A1* | 11/2012 | Pelletier | H04W 72/1221 370/252 |
| 2013/0095767 A1 | 4/2013 | Tajima et al. | |
| 2013/0286957 A1 | 10/2013 | Bucknell | |
| 2014/0016614 A1 | 1/2014 | Velev | |
| 2014/0126489 A1 | 5/2014 | Zakrzewsli | |

FOREIGN PATENT DOCUMENTS

| | | |
|---|---|---|
| CN | 101411115 | 4/2009 |
| CN | 102036230 | 4/2011 |
| EP | 2 136 592 | 12/2009 |
| JP | 2010-541421 | 12/2010 |
| JP | 2013-511862 | 4/2013 |
| RU | 2 406 242 | 12/2010 |
| RU | 2 407 193 | 12/2010 |
| WO | WO 2010/024550 | 3/2010 |
| WO | WO 2011/152665 | 12/2011 |
| WO | WO 2011/158377 | 12/2011 |
| WO | WO 2012/041363 | 4/2012 |
| WO | WO 2012/048915 | 4/2012 |
| WO | WO 2012/112320 | 8/2012 |

OTHER PUBLICATIONS

Japanese Office Action dated Jan. 30, 2017 issued in counterpart application No. 2015-511676, 9 pages.
European Search Report dated Dec. 22, 2015 issued in counterpart application No. 13787032.5-1870, 9 pages.
3rd Generation Partnership Project; Technical Specification Group Services and System Aspects; Universal Mobile Telecommunications System (UMTS) access stratum; Services and Functions (Release 10), 3GPP TS 23.110 V10.0.0, Mar. 2011.
Chinese Office Action dated Sep. 29, 2016 issued in counterpart application No. 201380024530.3, 43 pages.
Chinese Office Action dated Jan. 6, 2020 issued in counterpart application No. 201710942950.X, 15 pages.

* cited by examiner

METHOD AND SYSTEM FOR CONNECTIONLESS TRANSMISSION DURING UPLINK AND DOWNLINK OF DATA PACKETS

PRIORITY

This application is a Continuation of U.S. patent application Ser. No. 13/891,857, which was filed in the U.S. Patent and Trademark Office on May 10, 2013, and claims priority under 35 U.S.C. § 119(a) to India Patent Application Serial No. 1863/CHE/2012, which was filed in the India Patent Office on May 10, 2012, and to India Patent Application Serial No. 3756/CHE/2012, which was filed in the India Patent Office on Sep. 10, 2012, the entire disclosure of each of which is hereby incorporated by reference.

BACKGROUND

1. Field

The present invention relates to data transfer in packet switched (PS) network and more particularly relates to infrequent or frequent small data transfer using connectionless approach.

2. Description of the Related Art

In today's evolving mobile market, high end User Equipments (UEs) is sought after by majority of buyers. The UEs are loaded with variety of applications. Many of these applications on the UEs run in background and infrequently perform small amount of data exchange to and from a wireless cellular network. This changes the basic assumption of packet switched Long Term Evolution (LTE) network that there will always be a bulk data transfer. Open applications on the UEs such as email sync, stock market updates, weather updates, keep alive messages to the server, ping for updates with the server (chat/social networking servers) are few examples of applications when the UEs communicate with a server without user intervention. This communication over the wireless cellular network with small amount of data exchange to and from the server is infrequent in nature.

Existing methods require the UEs to transit from idle state to connected state, even for such infrequent communications that involve small amount of data exchange. The existing methods in LTE require the UEs to establish legacy dedicated Evolved Packet System (EPS) bearers (radio bearer, S1 bearer and S5/S8 bearer) between a UE, Radio Access Network (RAN) node and core network entities. The dedicated bearer refers to logical or virtual connection between the UE, RAN node and the core network entities. The established legacy dedicated bearer for the UE can be a default bearer or a dedicated bearer. The radio bearer transports data packets of an EPS bearer between the UE and the RAN node. The S1 bearer transports the data packets of an EPS bearer between the RAN node and a Serving Gateway (SGW) entity in the core network. The S5/S8 bearer transports the data packets of an EPS bearer between the SGW and the Packet data network Gateway (PGW) entity in the core network. There is a one-to-one mapping between radio, S1 and S5/S8 bearers for each EPS bearer established by the UE. This end-to-end EPS bearer realizes the negotiated Quality of Service (QoS) for the service.

The signaling overhead for establishment of dedicated bearer is very high as compared to the amount of data (infrequent small data) being transferred, affecting data transfer efficiency of the wireless cellular network. Moreover, with increase in Machine Type Communication (MTC) devices like power meters which generate small amount of data that is infrequently exchanged with the wireless cellular network leads to signaling congestion.

Multitude of such MTC devices try to switch to connected state for setting up dedicated EPS bearers for small amount of data exchange. This may lead to signaling congestion and increase the wireless cellular network resource consumption. With existing methods, frequent switching to connected state also drains battery of the UEs.

SUMMARY

An aspect of the embodiments herein is to provide a method and system for establishing common bearers between a Radio Access Network (RAN) node and a Serving Gateway (SGW) and further between the SGW and a Packet Data Network Gateway (PGW) of the wireless cellular network for uplink (UL) and downlink (DL) transmission of data packets using a connectionless transmission mode during idle state of a User Equipment (UE).

Another aspect of the embodiments herein is to provide a method to append routing information to the data packets so as to route the data packets on the established common bearers in a self-sustainable manner.

Another aspect of the embodiments herein is to provide a method to utilize a modified Uu interface between the UE and the RAN node during the connectionless transmission mode.

Another aspect of the embodiments herein is to provide a connectionless indicator (CL-indicator) that enables the UE to switch from legacy connection oriented transmission mode to the connectionless transmission mode.

Another aspect of the embodiments herein is to provide a method for securing the data packets with integrity and/or ciphering protection for uplink-downlink (UL-DL) transmission during the connectionless transmission mode.

In accordance with an aspect, a method is provided for transmitting a message by a user equipment (UE) in a network. The method includes transmitting, by the UE, to a radio access network (RAN) node, a random access channel (RACH) message including identifier information for identifying a serving gateway in a core network; receiving, by the UE, from the RAN node, a random access (RA) response message including uplink (UL) grant information; and transmitting, by the UE, to the RAN node, a data message including encrypted data in an idle mode. The data message is transmitted from the RAN node to the serving gateway based on the identifier information, and the encrypted data is generated by the UE, and the encrypted data is decrypted by the serving gateway.

In accordance with an aspect, a user equipment (UE) is provided in a network. The UE includes a transceiver; and at least one processor configured to control the transceiver to transmit, to a radio access network (RAN) node, a random access channel (RACH) message including identifier information for identifying a serving gateway in a core network, receive, from the RAN node, a random access (RA) response message including uplink (UL) grant information, and transmit, to the RAN node, a data message including encrypted data in an idle mode. The data message is transmitted from the RAN node to the serving gateway based on the identifier information, and the encrypted data is generated by the UE, and the encrypted data is decrypted by the serving gateway.

In accordance with an aspect, a method is provided for receiving a message by a radio access network (RAN) node in a network. The method includes receiving, by the RAN node, from a user equipment (UE), a random access channel (RACH) message including identifier information for identifying a serving gateway in a core network; transmitting, by the RAN node, to the UE, a random access (RA) response message including uplink (UL) grant information; receiving, by the RAN node, from the UE in an idle mode, a data message including encrypted data; identifying, by the RAN node, the serving gateway based on the identifier information; and transmitting, by the RAN node, to the serving gateway, the data message. The encrypted data is generated by the UE, and the encrypted data is decrypted by the serving gateway.

In accordance with an aspect, a radio access network (RAN) node is provided in a network. The RAN node includes a transceiver; and at least one processor configured to control the transceiver to receive, from a user equipment (UE), a random access channel (RACH) message including identifier information for identifying a serving gateway in a core network, transmit, to the UE, a random access (RA) response message including uplink (UL) grant information, and receive, from the UE in an idle mode, a data message including encrypted data, identify the serving gateway based on the identifier information, and control the transceiver to transmit, to the serving gateway, the data message. The encrypted data is generated by the UE, and the encrypted data is decrypted by the serving gateway.

BRIEF DESCRIPTION OF THE DRAWINGS

The above and other aspects, features, and advantages of certain embodiments of the present invention will be more apparent from the following detailed description taken in conjunction with the accompanying drawings, in which.

Throughout the drawings, it should be noted that like reference numbers are used to depict the same or similar elements, features, and structures.

DETAILED DESCRIPTION

Figure 1:
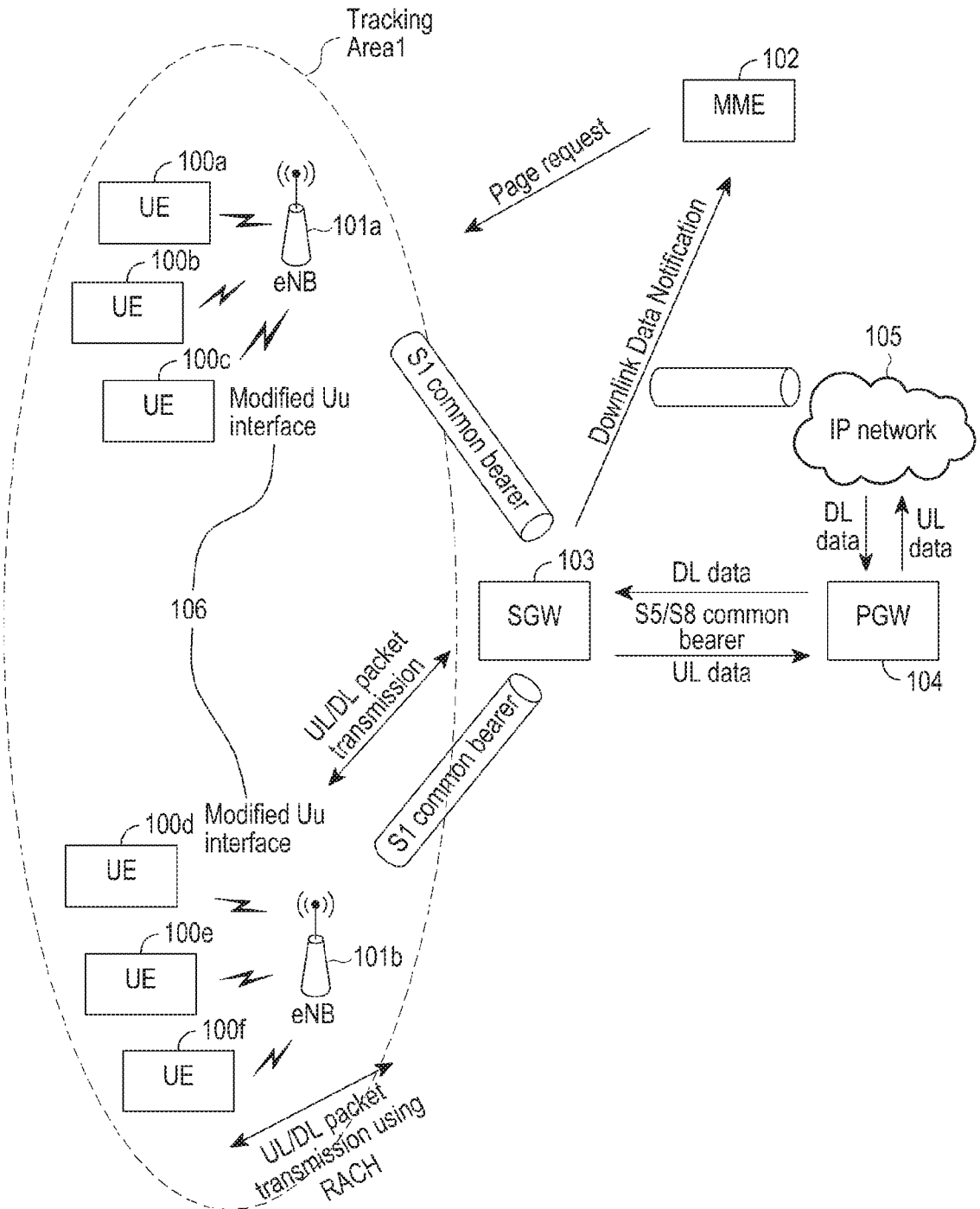
FIG. 1 illustrates a common bearer set up in a wireless cellular network for uplink (UL) transmission and Downlink (DL) transmission of data packets in a connectionless transmission mode, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein achieve a method and system for uplink (UL) and downlink (DL) transmission of data packets in a wireless cellular network, during idle state of a User Equipment (UE) using connectionless transmission mode. The method establishes an S1 common bearer between a Radio Access Network (RAN) node and a Serving Gateway (SGW) and a S5/S8 common bearer between the SGW and a Packet Data Network Gateway (PGW). The method defines a new Uu interface based on Random Access Channel (RACH) procedure between the UE and the RAN node such as a base station, evolved NodeB (eNB) and the like. The RACH procedure can be an existing RACH procedure (contention based), a modified RACH procedure or an optimized RACH procedure and the like. The S1 common bearer and S5/S8 common bearer provides a single logical connection within the wireless cellular network for transporting (routing) data packets from all the UEs in idle state served by a RAN node on a common transport channel. In an embodiment, the UE indicates the support of connectionless transmission using NAS message to the wireless cellular network. In an embodiment, the NAS message that carries the UE connectionless transmission mode support includes but not limited to Attach request, Tracking Area Update Request. In another embodiment, the UE indicates the support of connectionless transmission explicitly using the UE capability exchange procedure.

In an embodiment, the MME indicates the support of connectionless transmission using NAS message to the UE. In an embodiment, the NAS message that carries the network support for connectionless transmission mode is at least one of: Attach accept, Tracking Area Update Accept.

In an embodiment, the S5/S8 bearer may be the existing bearer established for the UE during connected state. The method appends the data packets with UE Identifier (ID) and/or routing information and/or security context identifier as packet header information to independently route the data packets through a wireless cellular network in a self-sustainable manner using the established common bearers and/or existing established UE bearers and the new Uu interface. The UE ID is a temporary subscriber identity such as (S-TMSI) or the like used over the air as using permanent UE ID such as Internal Mobile Subscriber Identity (IMSI) may pose a security threat. The UE ID is used to uniquely identify the UE by the RAN node, and/or the SGW and/or PGW in wireless cellular network during the UL transmission and the DL transmission in the connectionless transmission mode. The method secures the data packets by providing integrity and/or ciphering protection by using a new key $K_{CLT}$ or using the retained Access Stratum (AS) security context established in the Connected state for connectionless transmission mode. $K_{CLT}$ is a key used for protection of connectionless mode traffic. The method secures the data packets between the UE and the eNB. In another embodiment, the method secures the data packets between the UE and the SGW. In an embodiment, the security context identifier is included in the connectionless transmission mode of data packet, in order to confirm the security context used is the same between the UE and the wireless cellular network. In an embodiment, the security context identifier includes but not limited to evolved Key Set Identifier (eKSI), NCC, new identifier assigned by the network for connectionless mode security context identification, security header for connectionless mode security context identification.

An uplink traffic flow template (UL-TFT) in the UE decides whether the UE needs to switch from legacy connection oriented transmission mode to connectionless transmission mode for UL, based on one or more filters. A connectionless indication (CL-indication) in paging notification from a core network (CN) informs the UE to connect to the RAN node using connectionless transmission mode for downlink transmission of data packets. For both UL transmission and DL transmission, the UE indicates selection of the connectionless transmission mode to serving RAN node using a CL-indication during the RACH procedure. A serving RAN node is the RAN node to which the UE is currently camped on.

The established common bearers and the new Uu interface enable the data packets to be transferred from the UE without the need for the UE to switch to connected state by establishing the Radio Resource Control (RRC) connection, thereby avoiding associated signaling. The connectionless transmission mode used for small amount of data exchange (transfer) reduces RRC signaling overhead, reduces network congestion, provides better network usage and increases battery life of the UE by reducing frequent switching to connected state.

Throughout the description the terms RAN node and Evolved nodeB (eNB) are used interchangeably. Throughout the description, the security context identifier and the evolved Key Set Identifier (eKSI) are used interchangeably.

Throughout the description the terms wireless cellular network and LTE network are used interchangeably.

Throughout the description the terms data packet (IP packet) and connectionless data packet are used interchangeably.

The entities of the LTE network includes but not limited to plurality of eNBs and the core network, wherein the core network includes but not limited to the MME, plurality of SGWs and plurality of PGWs.

The disclosed method and system for connectionless transmission mode is applicable to any user equipment (UE). The UE can be a smart phone, a tablet, a personal digital assistant (PDA), an MTC device having LTE radio and the like.

In an embodiment, connectionless transmission mode for small data exchange is applied to $3^{rd}$ Generation Partnership Project (3GPP) wireless cellular network based on Universal Mobile Telecommunications System (UMTS). In case of UMTS, the S1 common bearer is established between the Radio Network Controller (RNC) and Serving GPRS Support Node (SGSN) and S5/S8 common bearer is established between SGSN and Gateway GPRS Support Node (GGSN).

Referring now to the drawings, and more particularly to FIGS. 1 through 22, where similar reference characters denote corresponding features consistently throughout the figures, there are shown preferred embodiments.

FIG. 1 illustrates a common bearer set up in a wireless cellular network for uplink (UL) transmission and Downlink (DL) transmission of data packets in connectionless transmission mode, according to embodiments as disclosed herein. The figure depicts UE 100a, UE 100b and UE 100c which are camped to eNB 101a and UE 100d, UE 100e and UE 100f are camped to eNB 101b. The figure also depicts a Mobility Management Entity (MME) 102, an SGW 103 and a PGW 104 and an IP network 105.

The figure depicts the LTE network environment for connectionless transmission mode for UL-DL transmission. The new Uu interface is defined between the UE 100a, UE 100b, UE 100c, UE 100d, UE 100e and UE 100f and their respective serving eNB 101a and eNB 101b. The MME 102 selects the SGW 103 and PGW 104 and establishes the S1 common bearer between the eNB 101a, eNB 101b and SGW 103 and also establishes S5/S8 common bearer between SGW 103 and the PGW 104.

In an embodiment, these common bearers are established statically and/or manually by the network (For example, using Self Organization Network (SON) methods).

The modified Uu interface 106 and the common bearers between the LTE network entities provide a common logical (virtual) connection for routing the data packets. The data packets are appended with routing information and/or UE identifier (UE ID) and/or security context identifiers, as packet header information to independently route the data packets through the LTE network in a self-sustainable manner.

The method disclosed provides end to end service for small data transfer to and from UE 100a, UE 100b, UE 100c, UE 100d, UE 100e and UE 100f when the UEs are in idle state. The method disclosed eliminates the need for the UE 100a, UE 100b, UE 100c, UE 100d, UE 100e and UE 100f to establish legacy dedicated EPS bearers (radio bearer and S1 dedicated bearer) by switching to Radio Resource Control (RRC) connected state.

Whenever any of the UE 100a, UE 100b, UE 100c, UE 100d, UE 100e and UE 100f intends UL transmission of data packets, the UL Traffic Flow template (TFT) in the UE 100a, UE 100b, UE 100c, UE 100d, UE 100e and UE 100f decides whether to adopt the legacy connection oriented transmission mode or connectionless transmission mode based on the filters. If the UL-TFT decides connectionless transmission mode then it provides indication to the Access Stratum (AS) layer i.e. the RRC layer of the UE so that RRC of the UE does not establish the RRC connection for UL transmission of data.

In an embodiment, the PDCP layer in any of the UE 100a, UE 100b, UE 100c, UE 100d, UE 100e and UE 100f will do deep packet inspection to identify whether the data is delay tolerant small amount of data and decide whether to adopt the legacy connection oriented transmission mode or connectionless transmission mode.

The RRC uses the standard value for the Radio Access Bearer Identifier (RAB-ID) for the connectionless transmission mode and request Packet Data Convergence Protocol (PDCP) of the UE 100a, UE 100b, UE 100c, UE 100d, UE 100e and UE 100f to protect the data packets. The PDCP layer in the UE protects the data packets and request the lower layers to send the data, if the security is applied between the UE and the eNB. The data is transmitted to the eNB 101a and eNB 101b using the modified Uu interface 106 based on the RACH procedure. In an embodiment, the PDCP protects the data from security threats, if the security is applied between the UE 100a and the eNB 101a. In another embodiment, the security is applied between the UE 100a and the SGW 103. In this scenario, the layer above the PDCP layer in the UE and the layer above the General packet radio service (GPRS) Tunneling protocol (GTP) layer in the SGW will protect the connectionless transmission. The method provides a new common layer between the SGW and the UE 100a to apply security, for example common IP layer and IPsec protection is applied using the security keys and selected algorithm for connectionless transmission mode. The SGW receives the security key ($K_{CLT}$) and the selected cryptography algorithm identifiers from the MME for securing and verification of the data packets transmitted in connectionless mode. Security termination in the eNB 101a or in the SGW 103 is core network specific and the core network and the UE 100a knows it well in advance. In an embodiment, data packets transmitted through connectionless transmission mode are encrypted but need not be integrity protected based on operator policy. The network initiates the security mechanism using the SMC procedure and indicates whether both encryption and/or integrity protection is applied.

In an embodiment, protection is applied to data packets in the connectionless transmission mode and need not be applied to the connection oriented transmission mode or vice versa. In an embodiment, protection is applied to the data packets using different algorithms for connection less transmission mode and connection oriented transmission mode approaches. The AS or NAS SMC procedure is used to negotiate and select the algorithms also for the connectionless transmission mode. In an embodiment, separate SMC procedure is performed between the eNB and the UE or between the MME and the UE for selecting the security algorithms for connection less transmission mode. Further in an embodiment, the algorithms to be used for connectionless transmission mode are pre-configured in the UE and in the wireless cellular network.

The modified Uu interface 106 for connectionless transmission mode is based on existing contention based RACH procedure with Connectionless indication (CL-indication) sent to the eNB 101a and eNB 101b through the RA message (Message 3) of the RACH procedure. The S1 common bearer is established for connectionless transmission mode between the eNB 101a and the SGW 103. Similarly, another S1 common bearer is established between eNB 101b and the SGW 103. The S5/S8 common bearer is established for connectionless transmission mode between the SGW 103 and the PGW 104. The S1 common bearer and S5/S8 common bearer are established at the core network entities SGW 103 and the PGW 104 by the MME 102. The data packets from the UE 100a, UE 100b, UE 100c and UE 100d, UE 100e, UE 100f are forwarded by the eNB 101a and eNB 101b respectively to the SGW 103 on respective S1 common bearer using the routing information in packet header of every data packet. The routing information is provided by the MME 102 to the UE 100a, UE 100b, UE 100c, UE 100d, UE 100e and UE 100f during the initial attach procedure in a Non Access Stratum (NAS) message and the routing information is updated during the TAU procedure. The routing information comprises a gateway Identifier (GW ID) which is appended as packet header information by the UE 100a, UE 100b, UE 100c, UE 100d, UE 100e and UE 100f when the data packet is transmitted in UL to eNB 101a and eNB 101b respectively using the modified Uu interface 106 for connectionless transmission mode. The GW ID enables the eNB 101a and eNB 101b to resolve the GW ID into Internet Protocol (IP) address of the SGW 103 using a mapping table pre-configured in the eNB 101a and eNB 101b or provided to the eNB 101a and eNB 101b by the core network entity MME 102. In an embodiment, the eNB 101a and eNB 101b request the core network entity to resolve the GW ID and provide the resolved parameters. Only the RAN network entity or the core network entity can resolve the GW ID. In an embodiment, the eNB 101*a* and eNB 101*b* forwards the received UL data packet as GPRS Tunneling Protocol-U Packet Data Unit (GTP-U PDU) to the SGW 103 on the respective S1 common bearer based on the resolved IP address of SGW using the GW ID.

In an embodiment, the eNB forwards (routing) the data packets to the SGW for the UL transmission by appending a UE ID, UL TEID, SGW IP address, PGW IP address as packet header information. The packet header information is sent in GPRS Tunneling Protocol-User (GTP-U) header.

In an embodiment, the eNB 101*a* and eNB 101*b* also resolves the IP address of the PGW 104 using the GW ID and appends the PGW 104 IP address to the packet header information of the GTP-U PDU forwarded to the SGW 103 on the respective S1 common bearer, when S5/S8 common bearer is used. The SGW 103 forwards the data packet as GTP-U PDU to the PGW 104 on established S5/S8 common bearer by identifying the PGW 104 by either resolving the GW ID based on UE ID or based on the IP address of the PGW 104 received in the packet header information of the data packets.

In an embodiment, the SGW 103 forwards the data packet on existing legacy S5/S8 dedicated bearer created during Packet Data Network (PDN) connection establishment for the UE 100*a*, UE 100*b*, UE 100*c*, UE 100*d*, UE 100*e* and UE 100*f*. When the existing legacy S5/S8 dedicated bearer is used, the eNB 101*a* and eNB 101*b* resolves the GW ID into IP address of SGW 103 and the S5/S8 TEID of PGW 104 and optionally its IP address.

In an embodiment, if the SGW 103 is connected to plurality of PGWs or the PGW 104 has plurality of PDN ports the SGW 103 resolves the received GW ID by mapping the GW ID to respective PGW or respective PDN port (Tunnel Endpoint Identifier (TEID)).

The data packets are then forwarded by the PGW 104 to the IP network 105 and reach their destination. For example the destination can be any application server.

The data packets forwarded by the IP network 105 arrive in the PGW 104 for DL transmission to one or more UEs. For example, data packets are to be delivered to UE 100*a*. A DL TFT maps a traffic flow aggregate to the EPS bearer in the downlink direction. Similar to the UE UL TFT, the PGW TFT decides whether to adopt the connection oriented transmission mode or the connectionless transmission mode based on the filters. The PGW 104 or SGW 103 may employ mechanism like Deep Packet Inspection (DPI) of data packets to identify whether to handle the DL delivery of data packet either through the connection oriented transmission mode or the connectionless transmission mode. Mechanisms such as application layer indication and the like (not based on DPI) can be used by PGW 104 or SGW 103 to identify DL data handling through connectionless transmission mode. The PGW 104 then forwards the data packets appended with CL indication (if the PGW 104 identifies the data packet to be transmitted in connectionless transmission mode), IMSI of the UE 100*a* and UE's 100*a* IP address to the SGW 103 using the established S5/S8 common bearer or existing S5/S8 dedicated bearer. If the S1 common bearer is not established or the UE context at the SGW 103 is not valid, then the SGW 103 send downlink data notification (DDN) to the MME 102 to page UE 100*a* for whom data packets have arrived for DL transmission, with CL indication to indicate arrived data packets to be delivered in connectionless transmission mode. The notification to MME 102 by the SGW 103 is for either establishing the S1 common bearer or updating the UE context at the SGW 103. The MME 102 maintains the UE context whenever any UE switches from connected state to idle state. The MME 102 uses this valid UE context to identify the tracking area (tracking area 1) of the UE 100*a*, then pages the eNB 101*a*, eNB 101*b* and plurality of eNBs in the tracking area 1. The page message comprises the CL-indication and UE ID as eNBs do not maintain the UE context when the UE is in idle state. The eNB 101*a*, eNB 101*b* and plurality of eNBs in the tracking area 1 sends paging notification to the UE 100*a* and plurality of UEs camped to respective eNBs with CL-indication and request the UE to fetch the data using the connectionless transmission mode.

In another embodiment, the eNB 101*a* and eNB 101*b* maintain the UE context during idle state (UE is identified at cell level) and hence only the eNB 101*a* currently serving the UE 100*a* (UE 100*a* camped to eNB 101*a*) sends the paging notification. This avoids other eNBs (eNB 101*b*) within the tracking area 1 unnecessary transmitting paging notifications. The UE context at eNB 101*a* and eNB 101*b* is maintained for all UEs in idle state camped to respective eNBs, supporting connectionless transmission mode. When the UE 100*a* does the cell re-selection to any new eNB in idle state based on cell re-selection rule, the UE 100*a* uses the cell update procedure to maintain the UE context at the new eNB after cell re-selection.

Upon receiving the CL-indication and UE ID in paging notification, the UE 100*a* responds to eNB 101*a* by initiating the RACH procedure with CL-Indication and its UE ID in RACH message 3 with the intention to fetch the DL data packet currently buffered at the SGW 103 using connectionless transmission mode. The eNB 101*a* responds to MME 102 with the identification of UE 100*a*, subsequently the MME 102 either initiates procedure to establish the S1 common bearer between SGW 103 and eNB 101*a* or if the S1 common bearer is already established it updates the UE context at the SGW 103. The UE context at SGW 103 comprises the eNB IP address of eNB 101*a* where the UE 100*a* is currently camped and the mapping of IMSI to S-TMSI.

The SGW 103 then forwards the DL data packet as GTP-U PDU to the eNB 101*a* on the established S1 common bearer where the packet header information contains the UE ID of UE 100*a*.

The data packets are secured by the eNBs and the UEs before transmitting over the modified Uu interface 106 by encrypting the data packets and/or applying the integrity protection with keys derived from the new key $K_{CLT}$ and using the selected algorithms for the connectionless transmission mode. The $K_{CLT}$ is derived by the UE 100*a* and MME 102 using negotiated cryptography algorithm or a pre-defined cryptography algorithm or the like.

The DL data packet is protected by eNB 101*a* using the connectionless security mechanism and delivered to UE 100*a* which is in idle state, during one of the paging opportunity of the UE 100*a*.

Figure 2:
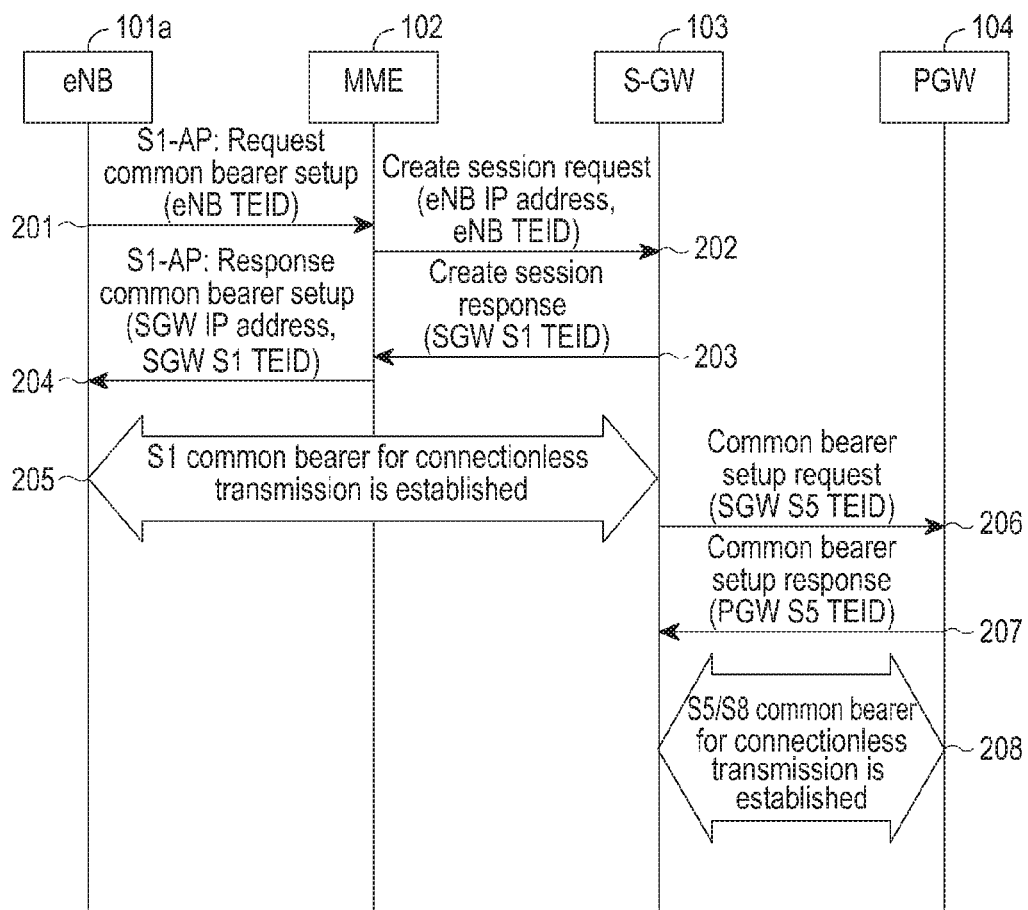
FIG. 2 illustrates a sequence diagram for establishment of common bearers for UL transmission of data packets in the connectionless transmission mode, according to embodiments as disclosed herein.

FIG. 2 illustrates a sequence diagram for establishment of common bearers for UL transmission of data packets in the connectionless transmission mode, according to embodiments as disclosed herein. The figure depicts the eNB 101*a*, the MME 102, the SGW 103 and the PGW 104. The eNB 101*a* initiates the common bearer set up establishment and sends (201) a S1-AP request for setting up the common bearer to the MME 102. The S1-AP request comprises eNB Tunnel End point identifier (TEID). On receiving the common bearer setup request, the MME 102 sends (202) a create session request to the SGW 103 comprising the eNB IP address and the received eNB TEID. The SGW 103 responds (203) to the session request with create session response comprising SGW S1 TEID. Further, the MME 102 replies (204) to the eNB's 101a S1-AP request with a S1-AP response comprising the IP address of SGW 104 and S1 TEID of the SGW 103. With eNB 101a aware of IP address, S1 TEID of the SGW 104 and SGW 104 aware of eNB's 101a IP address and eNB TEID logical connection is established (205) between eNB 101a and the SGW 103 called the S1 common bearer.

Further, the SGW 103 sends (206) the common bearer set up request to the PGW 104 comprising the SGW S5 TEID. The PGW 104 responds (207) to the SGW 103 with the common bearer set up response comprising the PGW's 104 PGW S5 TEID. With the SGW 103 aware of PGW S5 TEID of the PGW 104 and the PGW 104 aware of SGW TEID of the SGW 103, logical connection is established (208) between SGW 103 and PGW 104 called the S5/S8 common bearer.

Figure 3:
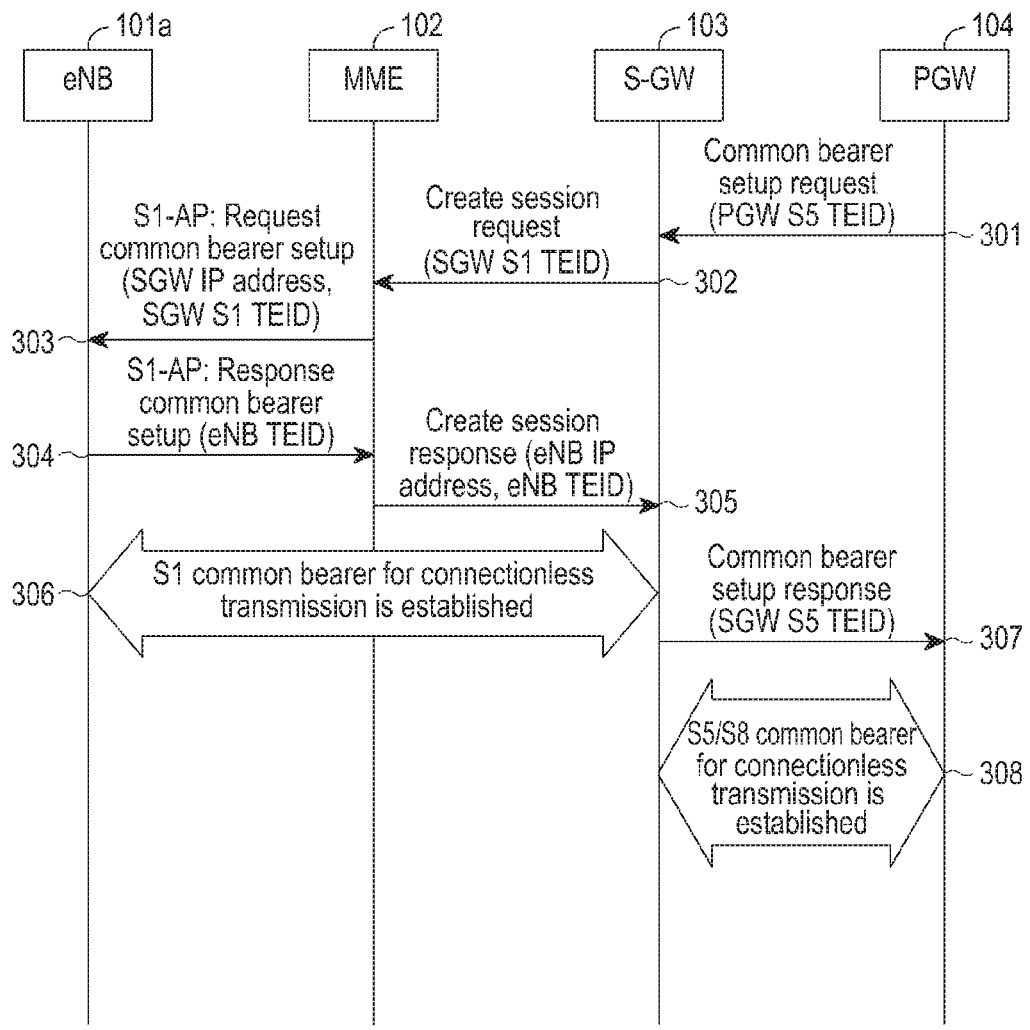
FIG. 3 illustrates the sequence diagram for establishment of common bearers for DL transmission of data packets in the connectionless transmission mode, according to embodiments as disclosed herein.

FIG. 3 illustrates the sequence diagram for establishment of common bearers for DL transmission of data packets in the connectionless transmission mode, according to embodiments as disclosed herein. The figure depicts the eNB 101a, the MME 102, the SGW 103 and the PGW 104. The PGW 104 initiates the common bearer set up establishment for the mobile terminated call and sends (301) the common bearer set up request comprising PGW S5 TEID of the PGW 104, to the SGW 103. The SGW 103 sends (302) create session request to the MME 102 comprising SGW S1 TEID of SGW 103. Further, the MME 102 sends (303) S1-AP request comprising the IP address of SGW 103 and S1 TEID of the SGW 103. The eNB 101a sends (304) S1-AP response to the MME 102 comprising the eNB IP address and the eNB TEID of the eNB 101a. On receiving S1-AP response the MME 102 sends (305) create session response to the SGW 103 comprising eNB IP address and eNB TEID of the eNB 101a. With eNB 101a aware of IP address, S1 TEID of the SGW 104 and SGW 104 aware of eNB's 101a IP address and the eNB TEID, logical connection is established (306) between eNB 101a and the SGW 103 called the S1 common bearer.

On establishment of S1 common bearer, the SGW 103 sends (307) connection bearer set up response comprising SGW S5 TEID of the SGW 103, to the PGW 104. With the SGW 103 aware of PGW S5 TEID of the PGW 104 and the PGW 104 aware of SGW TEID of the SGW 103, logical connection is established (308) between SGW 103 and PGW 104 called the S5/S8 common bearer.

Figure 4:
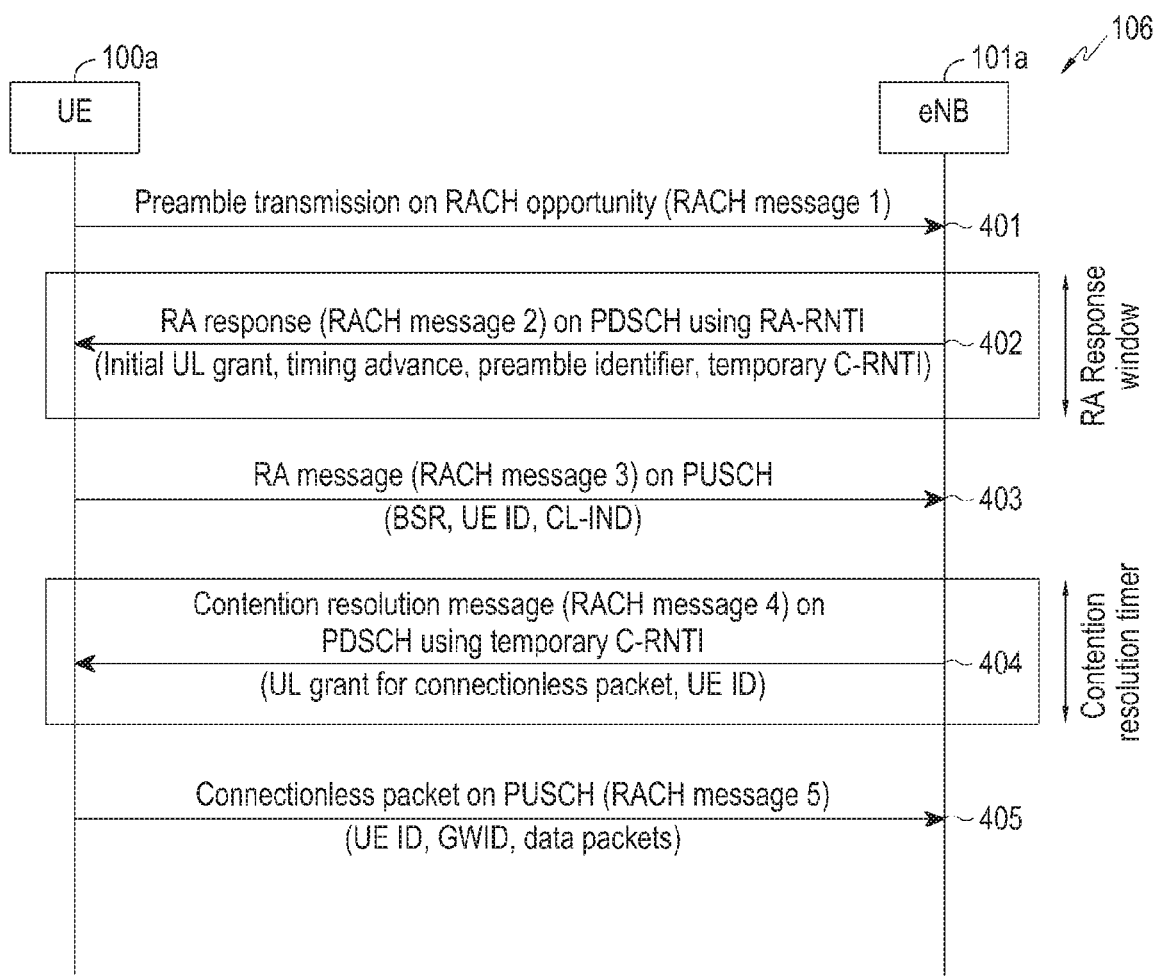
FIG. 4 illustrates the sequence diagram explaining new Uu interface for Uplink (UL) transmission in connectionless transmission mode based on existing Random Access Channel (RACH) procedure using Random Access-Radio Network Temporary Indicator (RA-RNTI) and temporary Cell-RNTI (C-RNTI), according to embodiments as disclosed herein.

FIG. 4 illustrates the sequence diagram explaining modified Uu interface 106 for Uplink (UL) transmission in connectionless transmission mode based on existing Random Access Channel (RACH) procedure using Random Access-Radio Network Temporary Indicator (RA-RNTI) and temporary Cell-RNTI (C-RNTI), according to embodiments as disclosed herein. The figure depicts only UE 100a camped to eNB 101a for illustrative purpose. There can be multiple UEs transmitting preamble sequence and requesting for UL grant. The figure depicts the modified Uu interface 106 between UE 100a and eNB 101a. The UE randomly selects one Random Access (RA) preamble sequence from Group A or Group B (existing preamble sequences reserved for contention based RACH) and transmits (401) on a Physical RACH (PRACH) as RACH message 1. The selected preamble sequence depends on the size of the message that the UE 100a expects to send in RA message (RACH Message 3). The eNB 101a detects the preamble transmission on the PRACH from several UEs including UE 100a. Further the eNB 101a sends (402) a RA response (RAR) as RACH message 2 on the Physical Downlink Shared Channel (PDSCH) addressed by the PDCCH using RA-RNTI within the RA response window. The RACH message 2 comprises several RARs each containing the initial UL grant (20 bits), timing advance (11 bits), RA preamble sequence identifier (RAPID: 6 bits) and temporary C-RNTI (16 bits) for all detected preambles. The UEs for which the RAPID matches with the RA preamble sequence transmitted in RACH message 1, transmit RA message (RACH message 3) on the Physical Uplink Shared Channel (PUSCH) at the specified UL grant in the RACH message 2. The UE 100a detects a match between the transmitted RA preamble sequence and the RAPID. Further UE transmits (403) RA message (RACH message 3) on the Physical Uplink Shared Channel (PUSCH) at the specified UL grant in the RACH message 2. The method modifies RACH message 3 of the contention based RACH to indicate to eNB 101a that UL data transfer using connectionless transmission mode. The modified RACH message 3 comprises a Buffer Status Report Medium Access Control Element (BSR MAC CE) for connectionless data and MAC Service Data Unit (SDU) which includes UE identity UE ID (for example S-TMSI) provided to UE 100a by MME 102 during initial attach procedure) and a CL indicator (CL-Ind) to provide the CL-indication for connectionless transmission mode.

With the transmission of RACH message 3 by the UE 100a a contention resolution timer is started. In the existing method the maximum value of the contention resolution timer is 64 ms; however it can be extended to higher value when CL-Ind is included in RACH message 3.

Further, the eNB 101a sends (404) Contention resolution message (RACH message 4) on the PDSCH addressed by the Physical Downlink Control Channel (PDCCH) using temporary C-RNTI. The RACH message 4 comprises a contention resolution ID which can be the UE ID received by the eNB 101a in RACH message 3. This method modifies the message 4 to have an UL grant for transmitting the connectionless packet. A Hybrid Automatic Repeat Request (HARQ) can be optionally used for RACH message 4. Thus, the UE which correctly decodes RACH message 4 and detects its own UE ID sends back a positive acknowledgement (ACK).

On receiving UL grant for connectionless transmission, the UE 100a prepares the connectionless data packet which comprises the PDCP SDU which has the data payload to be transmitted, UE ID and Gateway Identity (GW ID) which is fetched by the PDCP layer of the UE 100a from the RRC. (GW ID is provided to UE 100a by MME 102 during initial attach procedure or updated during TAU procedure) Further the PDCP hands over the data packet to lower layers for transmission on the PUSCH at the specified UL grant in RACH message 4. PDCP header is extended (append) to incorporate the UE ID and the GW ID as packet header information. Further the UE 100a transmits (405) the data packet appended with packet header information to the eNB 101a in RACH message 5.

In an embodiment, the MME 102 provides the GW ID in Attach Accept and/or Tracking Area Update (TAU) Accept message to the UE 100a. The GW ID may have network topology hiding features that prevent external entities including UE 100a from resolving the core network nodes SGW 103, and PGW 104 internal IP address using the GW ID. Only wireless network entities such as the MME 102, the eNB 101a can resolve the IP address or identify the SGW 103 and/or PGW 104 using the GW ID.

In an embodiment, the PGW 104/SGW 103 can have multiple identifiers and the MME provides the GW ID randomly from multiple GW IDs for the PGW 104 or SGW 103 to UE 100*a*. Thus, the real number of available PGWs or SGWs within the wireless cellular network is not known to the external entities.

Figure 5:
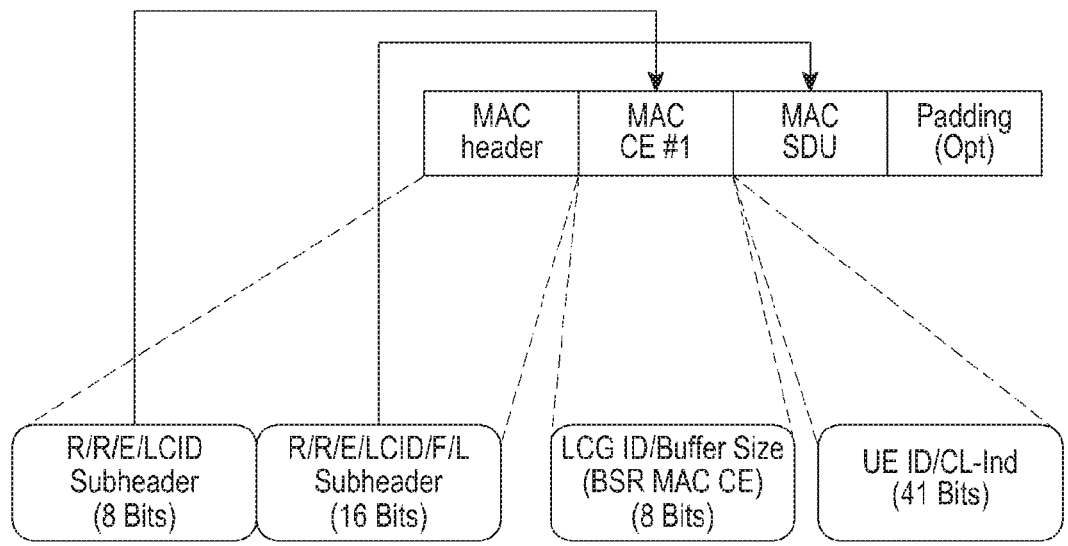
FIG. 5 illustrates a RACH message 3 (RA Message) containing Buffer Status Report (BSR) and CL-indicator for connectionless transmission mode, according to embodiments as disclosed herein.

FIG. 5 illustrates a RACH message 3 (RA Message) containing Buffer Status Report (BSR) and CL-indicator for connectionless transmission mode, according to embodiments as disclosed herein. The figure depicts RACH message 3 comprising MAC header, MAC CE#1, MAC SDU and optional padding bits. The MAC header comprises R/R/E/LCID Subheader (8 Bits) and R/R/E/LCID/F/L Subheader (16 Bits). The method includes MAC CE#1 (8 Bits) which comprises LCG ID/Buffer Size, the BSR MAC CE as part of RACH message 3. The method disclosed modifies the MAC SDU which comprises UE ID such as S-TMSI and CL-Ind. Thus, FIG. 5 depicts possibility of UL transmission of data packet in RACH Message 3, if RACH message 3 can accommodate the data packet.

Figure 6A:
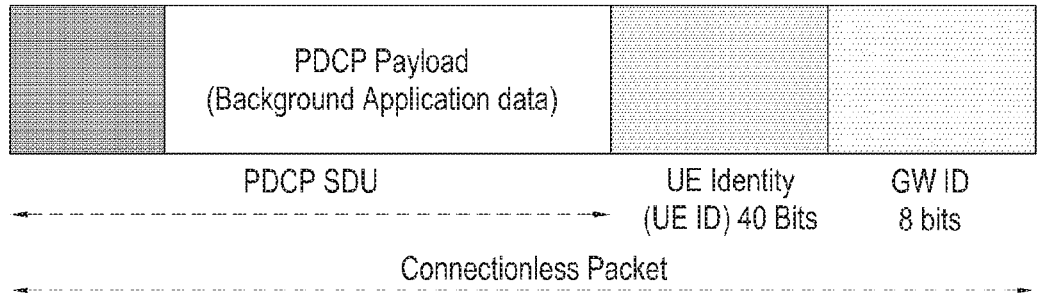
FIGS. 6A, 6B and 6C illustrate a connectionless data packet appended with packet header information comprising UE ID and GW ID at different bit positions in the appended data packet, according to embodiments as disclosed herein.
Figure 6B:
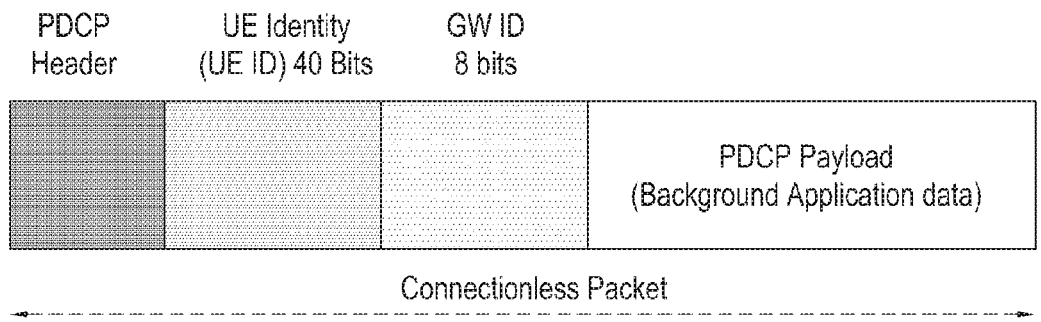
Figure 6C:
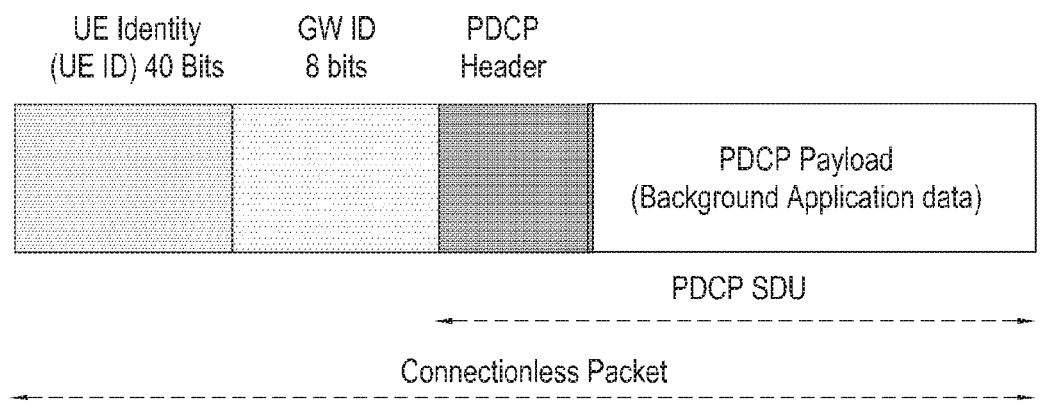

FIGS. 6A, 6B and 6C illustrate a connectionless data packet appended with packet header information comprising UE ID and GW ID at different bit positions, according to embodiments as disclosed herein.

FIG. 6A depicts arrangement of connectionless data packet with the PDCP header and the PDCP payload (data to be transmitted) combined as a PDCP SDU and placed first followed by UE ID (40 bits) and GW ID (8 bits). In this approach, UE ID/GW ID is not ciphered and UE ID/GW ID can be easily fetched by eNB 101*a* for further processing. Further PDCP SDU can be easily separated out from connection less packet.

FIG. 6B depicts arrangement of connectionless data packet with the PDCP header followed by UE ID (40 Bits) and the GW ID (8 bits) and in the end the PDCP pay load (data to be transmitted). In this approach, all the extra fields other than PDCP payload are together along with header which makes it possible to combine them as an extended header or as extended payload and accordingly the ciphering can be applied.

FIG. 6C depicts arrangement of connectionless data packet with the UE ID (40 Bits) followed by GW ID (8 bits) and the PDCP SDU. The PDCP SDU comprises the PDCP header and the PDCP pay load (data to be transmitted). In this approach, the connectionless data packet resembles the IP packet structure where the packet identities and destination identities are placed at the start of the connectionless packet. Thus, the actual PDCP SDU can be easily separated out from the connection less packet. In an embodiment, similar to the FIGS. 6A, 6B, 6C, the information is appended in the GTP header between the eNB and the SGW and also between the SGW and the PGW.

In an embodiment, the size of UE ID and GW ID varies subject to optimization.

In an embodiment, the connectionless data packet from the PDCP is fetched by MAC and MAC adds the UE ID and GW ID provided by RRC.

Figure 7:
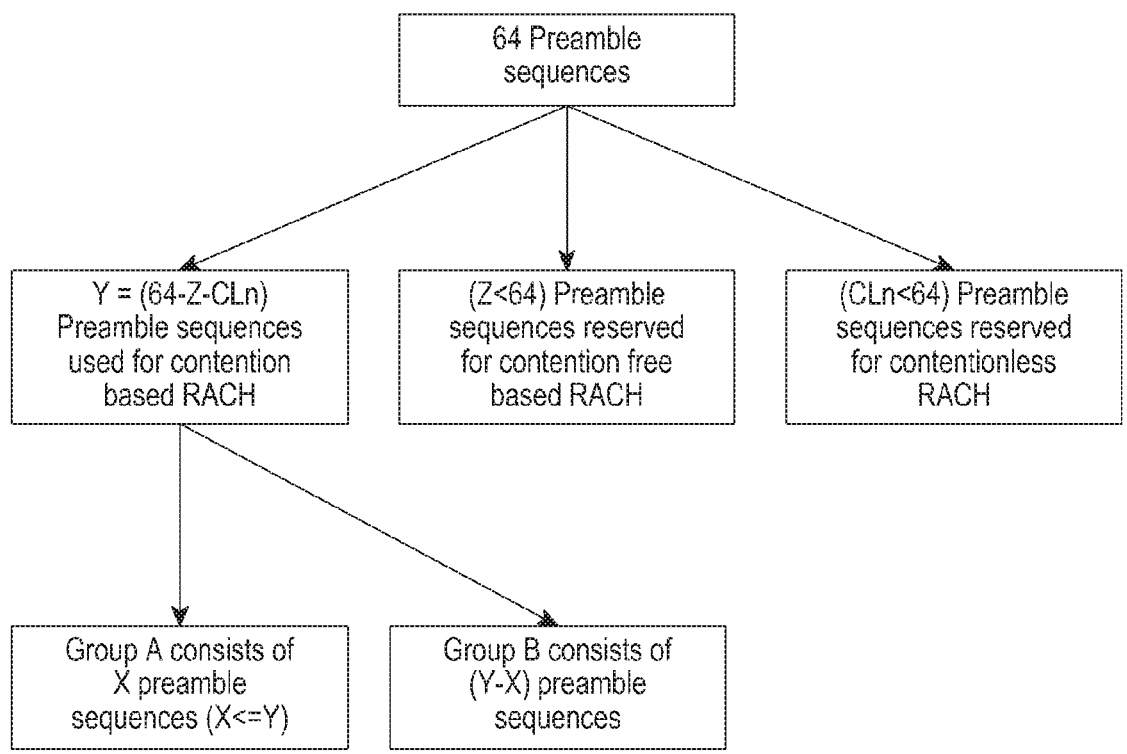
FIG. 7 illustrates an exemplary RACH preamble sequence partitioning with a new preamble sequences reserved for the connectionless transmission mode, according to embodiments as disclosed herein.

FIG. 7 illustrates an exemplary RACH preamble sequence partitioning with new preamble sequences reserved for the connectionless transmission mode, according to embodiments as disclosed herein. The figure depicts 64 preamble sequences (6 bit preamble identifier RAPID) used to initiate the random access procedure. From the available 64 preamble sequences CLn sequences are reserved for connectionless RACH procedure. Z preamble sequences reserved as dedicated preambles for contention free RACH during handover and remaining Y preamble sequences (Y=64−Z−CLn) are partitioned in Group A and Group B to be used for contention based RACH, in accordance with the existing RA preamble partitioning.

The RA preamble sequence partitioning for connectionless RACH procedure has no impact on the legacy UE. When the UE 100*a*, supporting connectionless transmission, desires to use connectionless transmission mode, then the UE 100*a* uses the preamble sequence from the reserved connectionless preamble sequence to initiate modified or optimized RACH procedure.

In an embodiment, the connectionless preamble sequence is further partitioned to inform the required UL grant in RACH message 2 so that UL grant in RACH message 2 can be variable depending on preamble sequence. In another embodiment, PRACH opportunities are explicitly configured by eNB 101*a* for connectionless RACH procedure in addition to usual PRACH for contention oriented procedure. When preamble sequence is transmitted on connectionless PRACH opportunity it is implicitly understood by eNB 101*a* that the RACH procedure is initiated for connectionless packet transmission. The connection oriented PRACH configuration and connectionless PRACH configuration is time multiplexed over several radio frames. Hence, for the connectionless PRACH usage there is no need for preamble sequence partitioning as shown in FIG. 7. All 64 preamble sequences can be used for connectionless RACH procedure and can be partitioned depending on the expected UL grant in RACH message 2.

Figure 8:
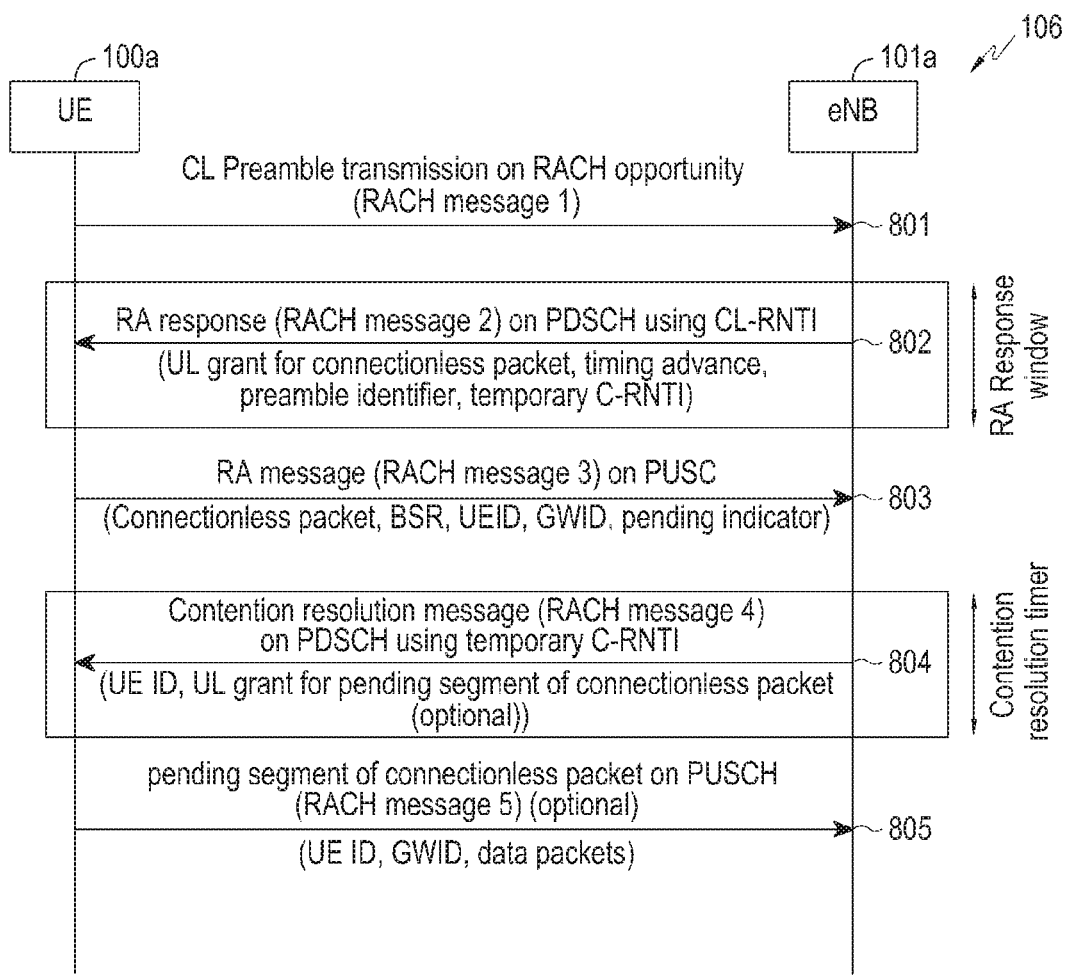
FIG. 8 illustrates the sequence diagram explaining the new Uu interface for UL transmission in connectionless transmission mode based on modified RACH procedure using connectionless-RNTI (CL-RNTI) and C-RNTI, according to embodiments as disclosed herein.

FIG. 8 illustrates the sequence diagram explaining the modified Uu interface 106 for UL transmission in connectionless transmission mode based on modified RACH procedure using connectionless-RNTI (CL-RNTI) and C-RNTI, according to embodiments as disclosed herein. The figure depicts UE 100*a* and eNB 101*a*. The figure depicts the modified Uu interface 106 between UE 100*a* and eNB 101*a*. The UE 100*a* randomly selects one of the CL preamble sequence reserved for connectionless RACH procedure and transmits (801) the selected preamble sequence in RACH message 1. The selected CL preamble sequence depends on the size of the message the UE 100*a* expects to send in RA message (RACH message 3).

In an embodiment, the PRACH opportunities are time multiplexed for normal RACH procedure and connectionless RACH procedure. The UE 100*a* randomly selects one of the 64 preamble sequence for transmission on the connectionless RACH opportunity.

The eNB 101*a* detects the CL preamble sequence transmission on the PRACH from several UEs. On receiving the CL preamble sequence from UE 100*a*, the eNB 101*a* sends (802) the RAR (RACH message 2) on the PDSCH addressed by the PDCCH using CL-RNTI within the RA response window. The RACH message 2 contains several RARs each containing the initial UL grant (20 bits) for CL transmission, timing advance (11 bits), RA preamble identifier (RAPID: 6 bits) and C-RNTI (16 bits) for all detected preamble sequences from several UEs.

The UE's 100*a* derivation of the CL-RNTI depends on the time (PRACH opportunity) where the UE 100*a* sent the CL preamble and also on the CL preamble sequence used (transmitted) by the UE 100*a*. The CL-RNTI is unique if two UEs use the same PRACH opportunity but different preamble sequences. Since the CL-RNTI derivation is based on code and time multiplexing, the contention resolution automatically takes place when different preamble sequences are used on the same PRACH opportunity.

In an embodiment, the temporary C-RNTI is not included in the RAR (RACH message 2).

The UL grant in RACH message 2 for connectionless transmission depends on a CL-Random Access Preamble Identifier (CL-RAPID) used by the UE 100*a* in RACH message 1. CL RAPID is the preamble sequence which is taken from the connectionless preamble set and is used in RACH message 1.

The UEs for which the RAPID matches with the CL preamble sequence transmitted in RACH message 1; transmit RA message (RACH message 3) on the PUSCH at the specified UL grant in RACH message 2. The UE 100*a* detects a match between the transmitted CL preamble sequence and the RAPID in RACH message 2. Further the UE 100*a* transmits (803) RA message (RACH message 3) on the PUSCH at the specified UL grant in RACH message 2.

The modified RACH message 3 comprises the BSR MAC CE, the connectionless data packet prepared by PDCP which includes UE ID and the GW ID fetched from RRC of UE 100*a*. The data packet is delivered by PDCP as the MAC SDU. If there is a pending segment of the data packet, the MAC adds the BSR MAC CE.

In an embodiment, the BSR MAC CE is treated as pending indicator to indicate if there is pending segment of connectionless data packet and/or any further packets to be transmitted in connectionless transmission mode.

In an embodiment, an explicit pending indicator is used to indicate if there is pending segment of connectionless data packet and/or any further packets to be transmitted in connectionless transmission mode.

The pending indicator if set (true) indicates a pending segment and if reset (false) indicates the connectionless data packet does not have pending segment to be transmitted.

If several UEs utilize same CL preamble sequence on the same PRACH opportunity then contention resolution starts by initiating contention resolution timer on transmission of RACH message 3 by the UE 100*a*. The max value of the contention resolution timer is 64 ms and can be extended to higher value.

On receiving RACH message 3, the eNB 101*a* sends (804) RACH message 4 on the PDSCH addressed by the PDCCH using temporary C-RNTI passed to the UE 100*a* in RACH message 2. The RACH message 4 comprises the UE ID received by the eNB 101*a* in RACH message 3 and UL grant to send the pending segment of connectionless data packet, if pending indicator was set (true) in RACH message 3.

The contention resolution message (RACH message 4) is sent on the PDSCH addressed by the PDCCH using C-RNTI. In another embodiment the contention resolution message (RACH MSG 4) is sent on the PDSCH addressed by the PDCCH using CL-RNTI.

The contention is resolved with reception of RACH message 4 comprising UE IDs for UEs that are allowed to send connectionless data packets.

In an embodiment, the UE which correctly decodes RACH message 4 and detects its own UE ID optionally sends back a positive acknowledgement (ACK) based on the HARQ procedure.

Further, the UE 100*a* sends (805) pending segment of the connectionless data packet on PUSCH by appending the pending segment with UE ID and GW ID in RACH message 5.

The modified RACH procedure in the figure reduces number of steps required to be performed during data transfer using connectionless transmission mode and enables quick release of wireless cellular network resources.

Figure 9:
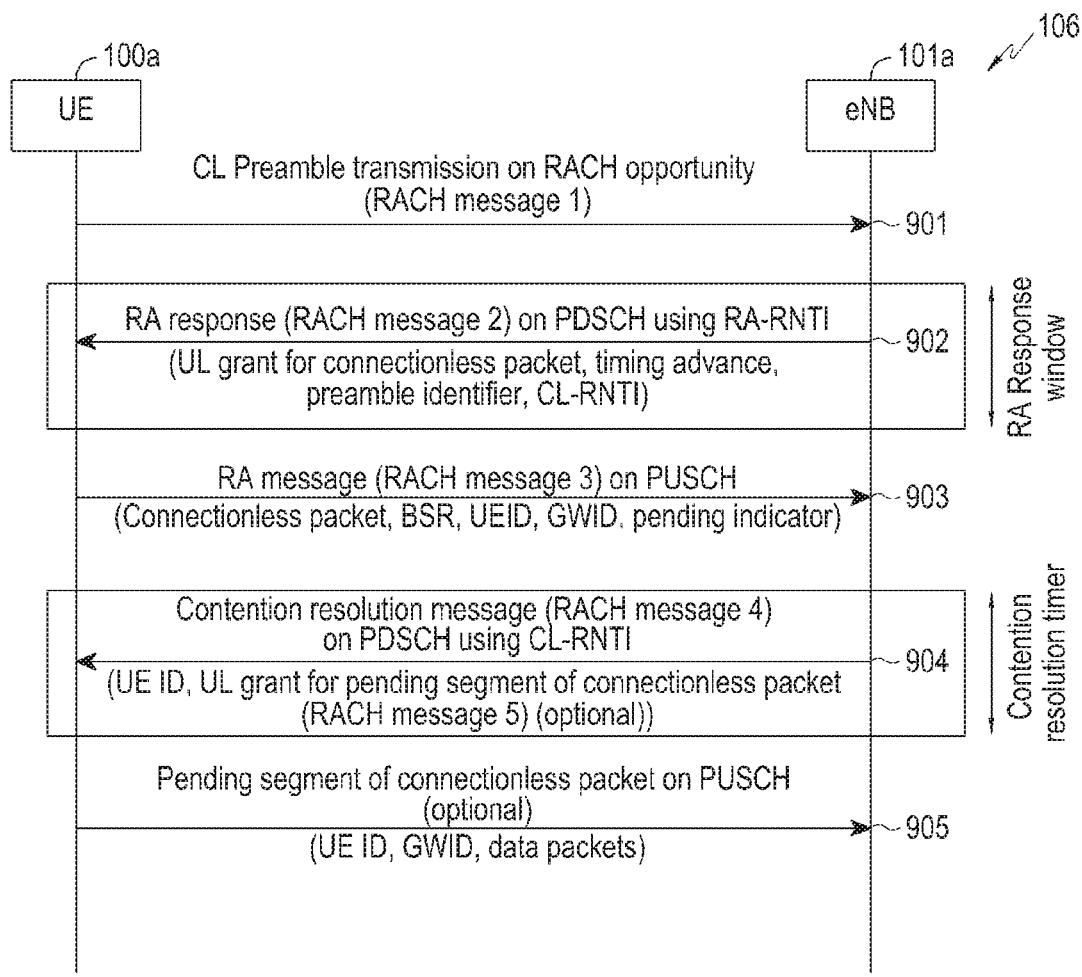
FIG. 9 illustrates the sequence diagram explaining the new Uu interface for UL transmission in connectionless transmission mode based on modified RACH procedure using RA-RNTI and CL-RNTI, according to embodiments as disclosed herein.

FIG. 9 illustrates a modified Uu interface 106 for UL transmission in connectionless transmission mode based on modified RACH procedure using RA-RNTI and CL-RNTI, according to embodiments as disclosed herein. The figure depicts UE 100*a* and eNB 101*a*. The figure depicts the modified Uu interface 106 between UE 100*a* and eNB 101*a*. The UE 100*a* randomly selects one of the CL preamble sequence reserved for connectionless RACH procedure and transmits (901) the selected preamble sequence in RACH message 1. The selected CL preamble sequence depends on the size of the message the UE 100*a* expects to send in RA message (RACH message 3).

In another embodiment, the PRACH opportunities are time multiplexed for normal RACH procedure and connectionless RACH procedure. The UE 100*a* randomly selects one of the 64 preamble sequence for transmission on the connectionless RACH opportunity.

The eNB 101*a* detects the CL preamble sequence transmission on the PRACH from several UEs. On receiving the CL preamble sequence from UE 100*a*, the eNB 101*a* sends (902) the RAR (RACH message 2) on the PDSCH addressed by the PDCCH using RA-RNTI within the RA response window. The RACH message 2 contains several RARs each containing the initial UL grant (20 bits) for CL transmission, timing advance (11 bits), RA preamble identifier (RAPID: 6 bits) and the new RNTI called CL-RNTI (16 bits) replacing the temporary C-RNTI of the existing RACH procedure.

The UL grant in RACH message 2 for connectionless transmission depends on the CL-Random Access Preamble Identifier (CL-RAPID) used by the UE 100*a* in RACH message 1.

The UEs for which the RAPID matches with the CL preamble sequence transmitted in RACH message 1, transmit RA message (RACH message 3) on the PUSCH at the specified UL grant in RACH message 2. The UE 100*a* detects a match between the transmitted CL preamble sequence and the RAPID in RACH message 2. Further the UE 100*a* transmits (903) RA message (RACH message 3) on the PUSCH at the specified UL grant in RACH message 2.

The modified RACH message 3 comprises the BSR MAC CE, the data packet for connectionless transmission prepared by PDCP which includes UE ID and the GW ID fetched from RRC of UE 100*a*. The data packet is delivered by PDCP as the MAC SDU. If there is a pending segment of the data packet, the MAC adds the BSR MAC CE.

In an embodiment, the BSR MAC CE is treated as pending indicator to indicate if there is pending segment of connectionless data packet and/or any further packets to be transmitted in connectionless transmission mode.

In an embodiment, an explicit pending indicator is used to indicate if there is pending segment of connectionless data packet and/or any further packets to be transmitted in connectionless transmission mode.

The pending indicator if set (true) indicates a pending segment and if reset (false) indicates the connectionless data packet does not have pending segment to be transmitted.

On receiving RACH message 3, the eNB 101*a* sends (904) RACH message 4 on the PDSCH addressed by the PDCCH using the CL-RNTI passed to the UE 100*a* in RACH message 2. The RACH message 4 comprises the UE ID received by the eNB 101*a* in RACH message 3 and UL grant to send the pending segment of connectionless data packet, if pending indicator was set (true) in RACH message 3.

The contention resolution message (RACH message 4) is sent on the PDSCH addressed by the PDCCH using CL-RNTI.

In an embodiment, the UE which correctly decodes RACH message 4 and detects its own UE ID optionally sends back a positive acknowledgement (ACK) based on the HARQ procedure.

Further, the UE 100*a* sends (905) pending segment of the connectionless data packet on PUSCH by appending the pending segment with UE ID and GW ID in RACH message 5.

The modified RACH procedure in the figure reduces number of steps required to be performed during data transfer using connectionless transmission mode and enables quick release of wireless cellular network resources.

Figure 10:
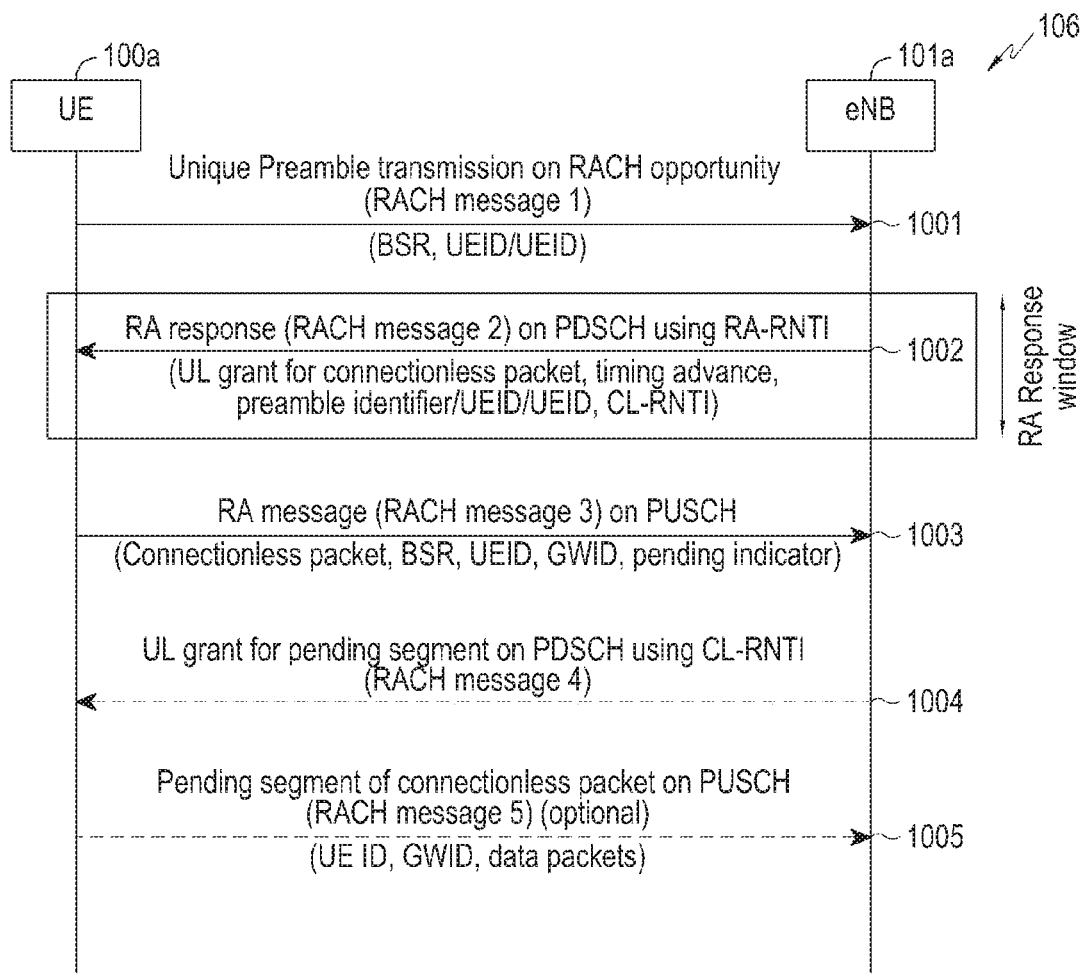
FIG. 10 illustrates the sequence diagram explaining the new Uu interface for UL transmission in connectionless transmission mode based on optimized RACH procedure with unique preamble sequence, according to embodiments as disclosed herein.

FIG. 10 illustrates the sequence diagram explaining modified Uu interface 106 for UL transmission in connectionless transmission mode based on optimized RACH procedure with unique preamble sequence, according to embodiments as disclosed herein. The figure depicts the UE 100*a* and the eNB 101*a*. The figure depicts the modified Uu interface 106 between UE 100*a* and eNB 101*a*. The UE 100*a* transmits (1001) a unique preamble sequence on RACH opportunity in RACH message 1. The unique preamble sequence is modified to carry information bits along with CL preamble sequence (new preamble sequence) reserved for connectionless transmission mode. The information in the unique preamble sequence comprises bits indicating the UE ID and/or the BSR. The UE 100*a* randomly selects one of the preamble sequence reserved for connectionless RACH for transmission on the PRACH.

In an embodiment, the selected CL preamble sequence implicitly conveys the BSR to the eNB.

Upon decoding the received unique preamble the eNB 101*a* identifies the UE 100*a* from the UE-ID and BSR in the unique preamble sequence. The eNB 101*a* detects the unique preamble sequence transmission on the PRACH from several UEs. On detecting unique preamble transmission from UE 100*a*, the eNB 101*a* sends (1002) the RA response (RAR) on the PDSCH addressed by the PDCCH using RA-RNTI within the RA response window. The UE derivation of the RA-RNTI is modified such that it depends on the time (PRACH opportunity) where it sent the preamble and also on the preamble used. The RA-RNTI is unique if two UEs used the same PRACH opportunity but different preamble sequences. Thus, the RA-RNTI derivation is based on code and time multiplexing and provides contention resolution on RA-RNTI level. This serves the purpose of contention resolution on RA-RNTI level. However, if the PRACH opportunity and the preamble sequence used by two UEs is same then it leads to same RA-RNTI derivation.

In an embodiment, the contention is resolved by eNB by including the UE-ID for UE 100*a* in RACH message 2 which also comprises the initial UL grant (20 bits), timing advance (11 bits), RA preamble identifier (optional) and CL-RNTI (for decoding connectionless DL data from eNB).

The UEs for which the UE IDs received in RACH message 2 matches with their RA preamble sequence transmitted in RACH message 1, transmit RA message (RACH message 3) on the PUSCH at the specified UL grant in RACH message 2. The UE 100*a* identifies its UE ID in RACH message 2 and transmits (1003) RACH message 3 on PUSCH at the specified UL grant in RACH message The RACH message 3 is modified and comprises the connectionless data packet prepared by PDCP which includes UE ID and the GW ID fetched from RRC. The connectionless data packet is delivered by PDCP as MAC SDU where MAC adds the BSR MAC CE if there is a pending segment of connectionless packet. The pending indicator may be optionally included to explicitly indicate if there is pending segment of connectionless packet. With the transmission of the RACH message 3 contention resolution timer is started. In existing methods, the max value of the contention resolution timer is 64 ms, however it can be extended to higher value.

Further, the eNB 101*a* sends (1004) the UL grant for pending segment in RACH message 4, on PDSCH using CL-RNTI, if the pending segment indicator was sent by the UE 100*a* in RACH message 3. On receiving the UL grant for pending segment, the UE 100*a* transmits (1005) the pending segment of the data packet appended with UE ID and GW ID on RACH message 5. In one embodiment, if any parameters required for the connection transmission mode key generation are to be sent, then the UE 100*a* sends the parameters in RACH message 3 (403) in the FIG. 4. Then the eNB 101*a* sends the request (message includes S-TMSI and key derivation parameters if any (for example Nonce, eKSI)) to the MME 102. Then the MME 102 derives the key for securing the connectionless transmission and sends the derived Key and its lifetime to the eNB 101*a*. The MME 102 use the key derivation parameters, if any, included in the request message, for the key derivation. The MME 102 might also include its key derivation parameters if any (for example, Nonce, NCC values, eKSI) along with the key to the eNB 101*a*. The eNB 101*a* stores the key and sends the key derivation parameters if any (for example, Nonce, NCC values) to the UE 100*a* in the Contention Resolution Message (RACH message 4). The UE 100*a* then uses the key derivation parameters, if any, received in the RACH message 4 for Key derivation and protects the connectionless packets. The protected packet is then transmitted to the eNB 101*a* in step 5 as shown in FIG. 4. This mechanism can be applied for the improved (4-stage) connectionless RACH procedure shown in FIG. 8, FIG. 9 and FIG. 10.

Figure 11A:
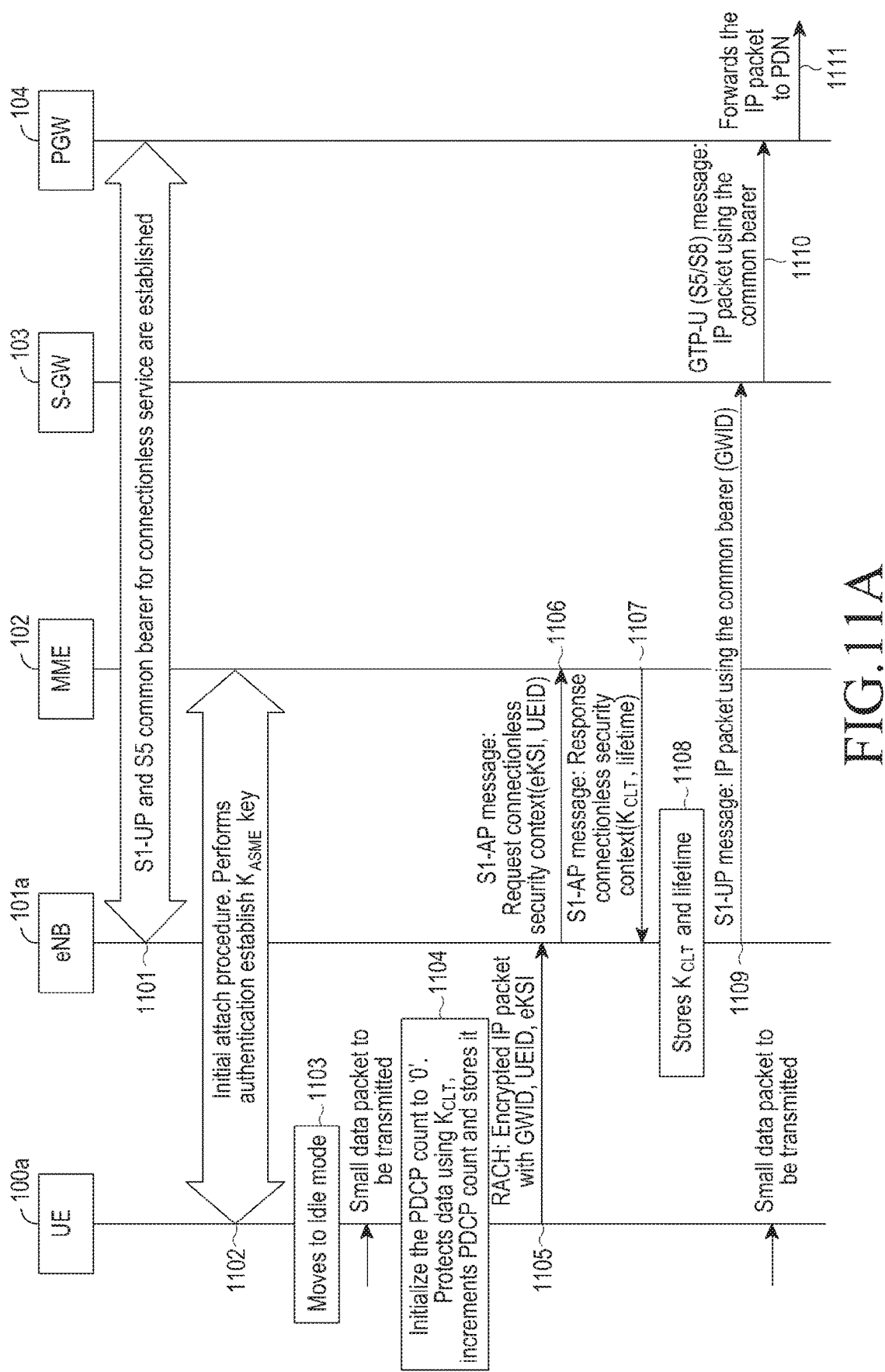
FIGS. 11A and 11B illustrate the sequence diagram explaining Network Access Stratum (NAS) level signaling between entities of the wireless cellular network for UL transmission in connectionless transmission mode, according to embodiments as disclosed herein.
Figure 11B:
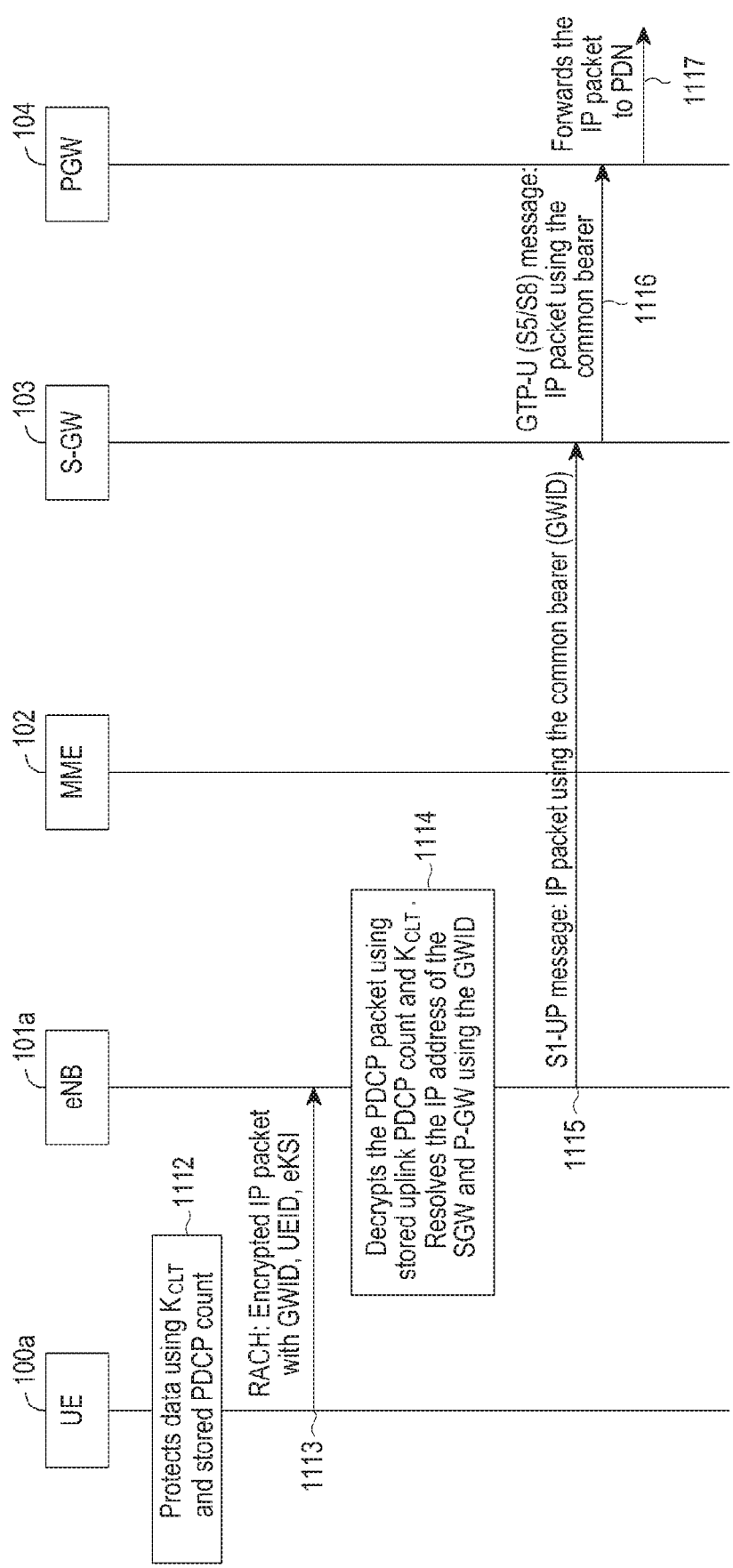

FIGS. 11A and 11B illustrate the sequence diagram explaining Network Access Stratum (NAS) level signaling between entities of the wireless cellular network for UL transmission in connectionless transmission mode, according to embodiments as disclosed herein. The figure depicts the UE 100*a*, the eNB 101*a*, the MME 102, the SGW 103 and the PGW 104. The MME 102 establishes (1101) the common bearers for the connectionless transmission mode as depicted in FIG. 2. The S1 common bearer is established between the eNB 101*a* and the SGW 103. The S5/S8 common bearer is established between the SGW 103 and PGW 104. The eNB 101*a* is the serving eNB of the UE 101*a*.

In an embodiment, if the legacy dedicated S5/S8 bearer created during Packet Data Network (PDN) connection establishment of the UE already exists (has not been tear down) then the legacy dedicated S5/S8 bearer of the UE 100*a* is used for connectionless transmission mode. The UE 100*a* initiates (1102) the initial attach procedure, performs authentication procedure and establishes base key $K_{ASME}$. The MME 102 checks whether the UE 100*a* is subscripted and/or capable of connectionless transmission. If the UE 100*a* is authorized and/or capable of connectionless transmission, then the MME 102 derives the new security key $K_{CLT}$ for connectionless transmission mode. The MME 102 informs the UE 100*a* about the selected security algorithms for the connectionless transmission and the GW ID. In an embodiment, MME informs the selected security algorithms for the connectionless transmission in the SMC procedure.

In an embodiment, if the MME 102 does not provide the selected security algorithm, then the algorithm selected for the Access stratum (AS) protection is used.

Once the initial attach procedure is performed and the UE 100a does not have any data to be transferred, the UE 100a switches (1103) to idle state. Further, the UE 100a receives (1103) the (small) data packet from the application layers for initiating a mobile originated (MO) data transfer. Based on the UL TFT the UE 100a decides to perform UL transmission using connectionless transmission mode. In an embodiment, if the UE 100a does not have any AS context, then the UE 100a initializes (1104) the PDCP COUNT to "0" for the Cell-ID or eNB ID. Then the UE 100a derives the $K_{CLT}$ from $K_{ASME}$. The MME 102 and the UE 100a use same method to derive the $K_{CLT}$. The UE 100a secures the data packets using the derived keys, selected algorithm and the PDCP COUNT.

In an embodiment, both integrity protection and encryption are applied to the connectionless data packets. Separate keys are derived from $K_{CLT}$ for confidentiality protection (encryption/decryption) and for integrity protection (for deriving MAC-I).

In an embodiment, same $K_{CLT}$ is used for encryption and integrity protection.

Further, the UE 100a appends (1105) routing information (GW ID) and UE identifier (UE ID) to the encrypted data packets as packet header information. The appended GW ID and UE ID independently routes the data packets over said modified Uu interface 106 and on established common bearers in the wireless cellular network in a self-sustainable manner.

After applying the security, the UE 100a transmits the data packets using the RACH procedure. The RACH procedure can be the existing contention based RACH, the modified RACH or the optimized RACH or the like.

In an embodiment, the evolved Key Set Identifier (eKSI) is included in the first packet transmitted to the eNB, in order to confirm the security context used is the same between the UE and the eNB. After receiving the connectionless data packet from UE 100a, the eNB 101a requests (1106) the MME 102 for the connectionless security context for the UE 100a by sending the UE ID and the eKSI (if received in the connectionless packet) in the S1-AP message. The MME 102 responds (1107) with the $K_{CLT}$ and its lifetime to the eNB 101a in S1-AP message. The eNB 101a stores (1108) the $K_{CLT}$, its lifetime and starts the timer. The eNB decrypts the data packets. If integrity protection is applied to the data packets the eNB 101a also verifies the integrity of the data packet. The UE ID and/or the GW ID appended to data packets is used for data packet forwarding and charging. The eNB 101a resolves the GW ID received in the data packet as packet header information into IP address the gateways and optionally the Uplink (UL) TEID. In an embodiment, the gateway IP address is of SGW 103 and optionally the IP address of destined PGW 104 also. The destined PGW is the PGW in the wireless cellular network to which the connectionless data packet is to be forwarded. Further, the eNB 101a appends the decrypted data packet with UE ID and IP address of gateways (SGW 103 and/or PGW 104) as packet header information. Then, the eNB 101a forwards (1109) the connectionless data packet as GTP-U PDU to the SGW 103 on S1 common bearer with S1-UP message using IP address of the SGW 103 resolved from GW ID.

In an embodiment, the eNB 101a resolves the GW ID into S5/S8 tunnel endpoint identifier (TEID) of the destined PGW 104 and appends the decrypted data packet with UE ID and S5/S8 TEID of the destined PGW 104 as packet header information.

The resolving of GW ID into IP address (es) and/or S5/S8 TEID of the destined PGW 104 is carried out using a mapping table provided to the eNB 101a by the MME 102.

In an embodiment, resolving of GW ID into IP address (es) and/or Uplink TEID is carried out using Domain Name Server (DNS) or a new dedicated GW ID resolving server in the core network.

Further, the SGW 103 maps the UE ID in the received data packets to International Mobile Subscriber Identity (IMSI) of the UE 100a. Then, the SGW 103 forwards (1110) the connectionless data packet to the destined PGW 104 in GPRS Tunneling protocol-User (GTP-U) S5/S8 message using the established S5/S8 common bearer, if the packet header information in the received data packet comprises the IP address of the destined PGW 104.

In an embodiment, if the packet header information in the received data packet comprises the UL TEID (for example S5/S8 TEID of the destined PGW 104), then the SGW 103 forwards the connectionless (small) data packet on existing bearer established for the UE 100a.

The PGW 104 then forwards (1111) the data packet to the Packet Data Network (PDN).

In an embodiment, if the SGW 103 is connected to multiple PGWs or if the PGW 104 has multiple PDN ports the SGW maintain mapping table to route the data packet to respective PGW or PDN port.

Further, the UE 100a receives another data packet for UL transmission using connectionless transmission mode from the application layers. The UE 100a protects (1112) the data packet using the $K_{CLT}$ and the stored PDCP COUNT. The UE 100a then increments the PDCP COUNT and stores it. The securing of data packets is done at the PDCP layer in the UE 100a (and also in the eNB 101a for DL). The UE 100a appends the GW ID received from the MME during session setup (example for the APN) and optionally the UE ID to the data packet, as to make this connectionless transmission data packet as self-sustained packet. In an alternative, the GW ID can also resolve the UE ID.

Further, the data packet is routed to the destination using the connectionless transmission mode procedure as described above. The UE 100a apply protection to the data packet and initiates (1113) the RACH procedure. The eNB 101a receives the data packet in RACH message 3 or RACH message 5 based on the RACH procedure used. The eNB 101a processes and verifies the (1114) the data packet using the UL PDCP count and $K_{CLT}$, resolves the common bearer path using GW ID received in the data packet to forward the data packets to the SGW 103. The eNB 101a sends (1115) the data packet as GTP-U PDU on the S1 common bearer using S1-UP message to the SGW 103. The SGW 103 forwards (1116) the data packet on S5/S8 bearer to the PGW 104 in GTP-U S5/S8 message (S5/S8 bearer can be common bearer or existing bearer established for the UE). Further, the PGW 104 forwards the data packet to the respective PDN.

Figure 12:
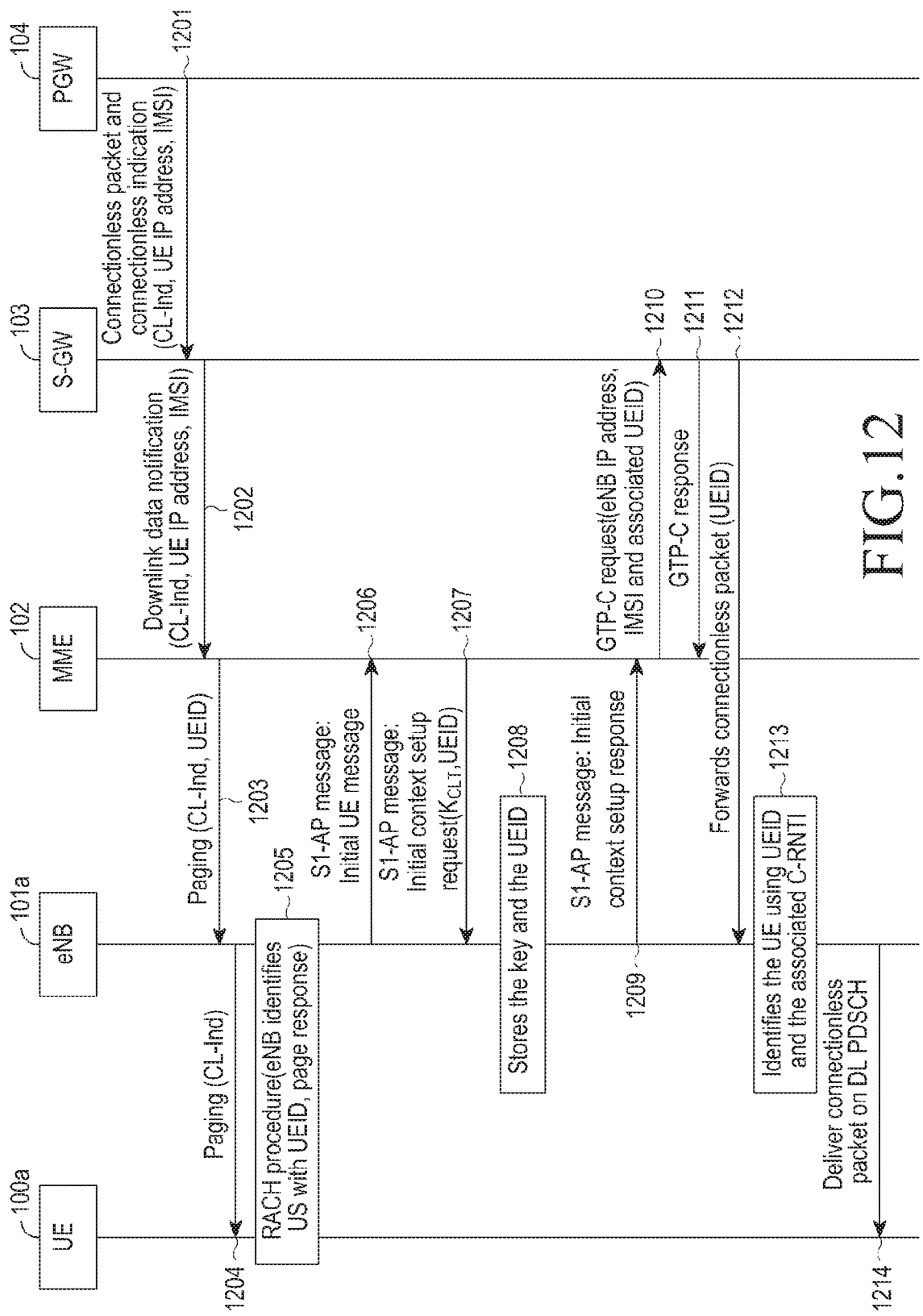
FIG. 12 illustrates the sequence diagram explaining signaling between entities of the wireless cellular network for DL transmission in connectionless transmission mode with UE context updated at a Serving, Gateway (SGW) according to embodiments as disclosed herein.

FIG. 12 illustrates the sequence diagram explaining signaling between entities of the wireless cellular network for DL transmission in connectionless transmission mode with valid UE context updated at a Serving Gateway (SGW), according to embodiments as disclosed herein. The figure depicts the UE 100a (in idle state), the eNB 101a, the MME 102, the SGW 103 and the PGW 104. The eNB 101a is the serving eNB of the UE 101a. The PGW 104 receives the data packet from the IP network 105 and identifies the UE 100a IMSI (for example using the TFT). Thus there is a mobile terminated data for the UE 100*a*. The data packet is identified for connectionless transmission mode by the TFT in the PGW 104 based on filters. The PGW 104 sends (1201) the connectionless data packet to the SGW 103 on the established S5/S8 common bearer or existing dedicated S5/S8 bearer created for the UE for the connectionless transmission mode. The data packet is flagged with the CL-indication and comprises the UE's 100*a* IP address and the IMSI. Alternatively, the data packet is identified for connectionless transmission mode by the SGW 103 based on Deep Packet Inspection (DPI). In this case, PGW 104 sends the packet without indication for connectionless transmission and SGW 103 identifies the packet. On receiving the data packet with the CL-indication and IMSI, the SGW 103 identifies the serving eNB 101*a* of the UE 100*a* using the valid UE context maintained in the SGW 103 if available. The UE context is provided to the SGW 103 by the MME 102 (the UE context includes the security context, if the security is applied between the UE 100*a* and the SGW 103 and further the UE 100*a* security context may have different validity timer) and remains valid till the associated timer in the SGW 103 does not expire. The UE context identifies IP address of the serving eNB 101*a* of the UE 100*a* among plurality of eNBs in the wireless cellular network and maps said IMSI with corresponding said UE ID (for example S-TMSI). If a valid UE context is available, then SGW 103 sends the data packet directly to eNB 101*a* on the common S1 as per eNB IP address in the UE context, after applying security to the data packet using the key $K_{CLT}$ and the selected security algorithm for connectionless transmission based on the operator policy, if security is applied between the UE 100*a* and the SGW 103. If the UE context is not valid or not available, the SGW 103 retains the connectionless data packet forwarded by the PGW 104 and sends (1202) a Downlink Data Notification (DDN) message to the MME 102. The Downlink Data Notification message comprises the UE ID for corresponding IMSI and the CL-indication.

Since the UE 100*a* is in idle state, the MME 102 has the context of the UE 100*a*, when the UE 100*a* switched from connected state to idle state. Using the UE context, the MME 102 sends (1203) a page message to all the eNBs in the tracking area (including eNB 101*a*) of the UE 100*a* in steps. The page message comprises the CL-indication and UE ID of the UE 100*a* since the eNBs do not maintain UE context of the UE 100*a* which is in idle state.

In an embodiment, when UE 100*a* in idle state performs cell re-selection to another new eNB, the UE 100*a* initiates the RACH procedure towards that new eNB, so that the respective new serving eNB updates the current camped cell of the UE 100*a* in the MME 102. In an embodiment, the MME 102 first pages in the current camped eNB of UE 100*a*. In another embodiment, the MME updates the UE context at the SGW whenever the idle state UE performs cell re-selection and the UE performs cell update towards the current camped eNB using the RACH procedure such that the IP address of the current eNB is updated at the MME.

On reception of the page message from the MME 102, the eNBs in the tracking area follow the normal idle state paging procedure and send (1204) paging notification to the UE 100*a* for delivery of connectionless data packet as identified from the CL indication in the page message from MME 102.

The idle state UE 100*a* monitors its paging opportunity and receives the paging notification using legacy procedure. Once the idle state UE 100*a* receives the paging notification carrying the CL-indication, the UE 100*a* initiates (1205) RACH procedure towards the eNB 101*a* so that it receives the UE ID from the UE 100*a*. The RACH procedure can be the existing RACH, the modified RACH or the optimized RACH and the like. The UE identification at the eNB 101*a* is complete with the matching of UE ID from UE 100*a* with that received from the MME 102. The eNB 101*a* which identified the UE 100*a* responds (1206) to the MME 102 with UE ID and IP address of serving eNB 101*a* in S1-AP message. The MME 102 then sends (1207) the $K_{CLT}$ and UE ID of the UE 100*a* to the eNB 101*a* requesting initial UE context set up request in the S1-AP message, if security is applied between the UE 100*a* and the eNB 101*a*. The eNB 101*a* stores (1208) the context (UE ID and $K_{CLT}$) of the UE 100*a* for further use. Further, the eNB 101*a* sends (1209) an initial context set up response in S1-AP message. On receiving the response from eNB 101*a*, the MME 102 sends (1210) a GPRS Tunneling protocol control (GTP-C) request message including (eNB IP address, IMSI and associated UE ID (for example, S-TMSI) to the SGW 103, wherein the GTP-C request message is at least one of: Create Session Request, Modify bearer Request. The SGW 103 responds (1211) by GTP-C response message, wherein the GTP-C response message is at least one of: Create Session Response, Modify bearer Response. This establishes the S1 common bearer for the connectionless transmission mode if the common bearer is not established previously. The UE context is updated with the eNB IP address where the UE is currently camped and the mapping of IMSI and UE ID, if the common bearer is previously established but the UE context is invalid or not available. Further, the SGW 103 forwards (1212) the connectionless data packet (destined for the identified UE 100*a*) on the S1 common bearer to the respective eNB 101*a* using the valid UE context that is created. In an embodiment, the MME sends the security context (including the necessary security parameters) for the connectionless transmission mode protection to the SGW 103 in the GTP-C request message, if security is applied between the UE 100*a* and the SGW 103.

In an embodiment, if the S1 common bearer is already established, the eNB 101*a* which identified the UE 101*a*, requests the SGW 103 to push the connectionless data packet to UE 101*a* on the S1 common bearer.

The MME 102 provides the IMSI and UE ID (mapping table) of the UE 100*a* to the SGW 103 and the SGW 103 swaps the IMSI of the UE 100*a* to the corresponding UE ID in all connectionless data packets. The eNB 101*a* identifies (1213) the UE 100*a* using the UE ID in the received connectionless data packet.

As eNBs are not aware of the IMSI, the swap operation enables the eNB 101*a* to identify the UE 100*a*. The eNB 101*a* delivers (1214) the connectionless data packet to the UE 100*a* on the PDSCH addressed by the PDCCH scrambled by either temporary C-RNTI or CL-RNTI. The connectionless data packet is protected by the eNB 101*a* or by the SGW 103. The UE 100*a* and the wireless cellular network are aware of which entity applies the security mechanism. The UE 100*a* process the secured data packet based on the security context available in the UE 100*a*.

In an embodiment, the paging notification contains the CL-Indication flag (for example 1 bit) and the random access preamble identifier (RAPID: 6 bits). The UE 100*a* uses the RAPID provided in paging notification to initiate the RACH procedure. The UE 100*a* uses the RA-RNTI to decode PDCCH addressing RACH message 2. In RACH message 2 the eNB 101*a* provides either temporary C-RNTI or CL-RNTI to the UE 100*a*. The RACH message 2 can include UL grant and/or DL assignment.

In an embodiment, the paging notification contains the CL-Ind flag, RAPID (6 bits) and connectionless RNTI (for example CL-RNTI: 16 bits). The UE 100*a* uses the RAPID provided in paging notification to initiate the RACH procedure. The UE 100*a* uses the CL-RNTI provided in paging notification to decode PDCCH addressing RACH message 2 or any other message of UL grant/DL assignment from the eNB 101*a*.

The UE 100*a* identification at the eNB 101*a* is complete with the matching of UE ID received from the MME 102 with that received from UE 100*a* in RACH message 3 as described in FIG. 4, FIG. 8 and FIG. 9. Thus, connectionless data packet delivery can either happen with RACH message 4 or with a DL assignment in RACH message 4, which indicates the System Frame number (SFN) and delivery window for connectionless packet delivery.

In an embodiment, the delivery of connectionless data packet is in RACH message 4 and the contention resolution timer is extended for several hundreds of milliseconds. The UE 100*a* decodes the PDCCH addressing RACH message 4 either with Temporary C-RNTI or CL-RNTI.

In an embodiment, RACH message 4 carries DL assignment indicating delivery of connectionless packet. The DL assignment in RACH message 4 indicates the SFN, sub frame and delivery window for connectionless packet delivery. The UE 100*a* wakes up at the indicated SFN and monitors the PDCCH either with Temporary C-RNTI or CL-RNTI for a time period equal to the indicated delivery window. If page indication carries the RAPID and the corresponding RAPID is used in UE 100*a* triggered RACH for CL data, UE identification at eNB can be done with RACH message 1. Then, the data packet or DL assignment for data packet can be sent in RACH message 2 itself.

In an embodiment, the DL assignment in RACH message 2 indicates delivery of connectionless data packet. Normally, RACH message 2 contains UL grant but when the RACH procedure is initiated due to paging notification with CL-indication having the RAPID, the RACH message 2 contains DL assignment instead of UL grant. The DL assignment in RACH message 2 indicates the SFN, sub frame and delivery window for connectionless data packet delivery. The UE 100*a* wakes up at the indicated SFN and monitors the PDCCH either with Temporary C-RNTI or CL-RNTI for a time period equal to the indicated delivery window.

In an embodiment, the delivery of connectionless packet is in RACH message 2. If RACH message 2 is used for delivery of connectionless data packet then the RAR window is increased for CL data delivery. The UE 100*a* decodes the PDCCH addressing RACH message 2 either with CL-RNTI provided in page message or the unique CL-RNTI derived by the UE 100*a* before transmitting RACH message 1 or with RA-RNTI.

The UE 100*a* identification at the eNB 101*a* is complete with the matching of UE ID received from the MME 102 with that received from UE 100*a* in the RACH message 3 for RACH procedure initiated in accordance with FIG. 4, FIG. 8, or FIG. 9 or at the reception of the unique preamble sequence (RACH message 1 comprising UE ID, in accordance with FIG. 10. Thus, connectionless data packet delivery can either happen with RACH message 2 or with a DL assignment in RACH message 2, which indicates the SFN and delivery window for connectionless data packet delivery.

If CL-RNTI is provided in paging notification UE 100*a* uses CL-RNTI to decode PDCCH addressing RACH message 2. If CL-RNTI is not provided in paging notification UE 100*a* uses either RA-RNTI or CL-RNTI to decode PDCCH addressing RACH message 2. This CL-RNTI may be derived based on mathematical function that utilizes RAPID provided in paging notification and the time during which the RAPID was transmitted on PRACH. If RA-RNTI is used to decode PDCCH addressing RACH message 2, then RACH message 2 includes temporary C-RNTI or CL-RNTI to decode PDCCH addressing any other message UL grant/DL assignment from the eNB 101*a*.

Figure 13:
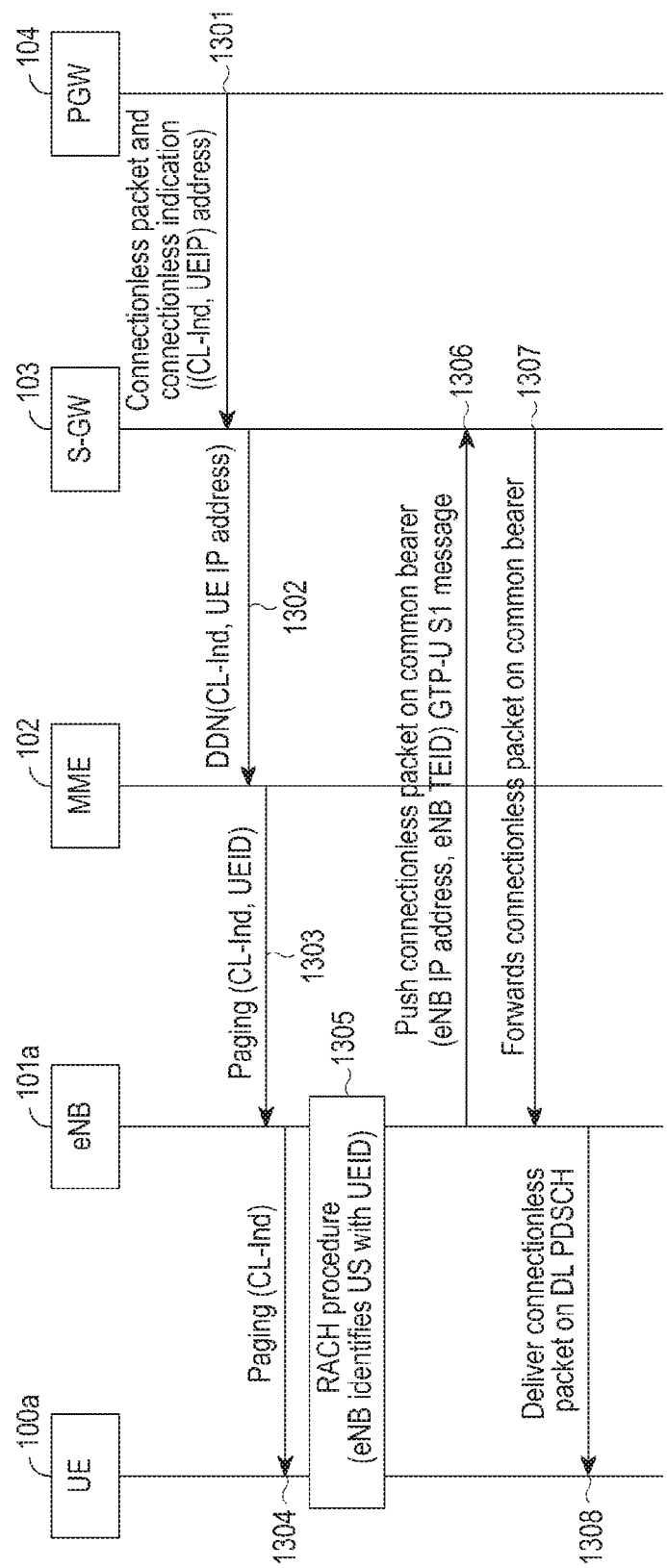
FIG. 13 illustrates the sequence diagram explaining signaling between entities of the wireless cellular network for DL transmission in connectionless transmission mode with UE context updated at the SGW, according to alternative embodiments as disclosed herein.

FIG. 13 illustrates the sequence diagram explaining signaling between entities of the wireless cellular network for DL transmission in connectionless transmission mode after updating the UE context updated at the SGW, according to alternative embodiments as disclosed herein. The figure depicts the UE 100*a* (in idle state), the eNB 101*a*, the MME 102, the SGW 103 and the PGW 104. In an embodiment, the MME 102 establishes the S1 and S5/S8 common bearers for connectionless transmission mode. In another embodiment, the common bearers are established statically and/or manually by the wireless cellular network (for example, using Self Organization Network (SON) methods). The eNB 101*a* is the serving eNB of the UE 101*a*. The PGW 104 receives the data packet from the IP network 105 and optionally identifies the UE 100*a* using TFT. The data packet is identified for connectionless transmission mode by the TFT in the PGW 104 based on filters. The PGW 104 sends (1301) the connectionless data packet to the SGW 103 and the established S5/S8 common bearer or existing S5/S8 bearer established for the UE, for the connectionless transmission mode. The data packet is flagged with the CL-indication and comprises the UE's 100*a* IP address and the IMSI. On receiving the data packet with the CL-indication (if identification is done by the PGW 104, alternatively SGW 103 identifies the connectionless transmission (for example using DPI) and IMSI, the SGW 103 is unable to identify the serving eNB 101*a* of the UE 100*a* as the UE context maintained in the SGW 103 is invalid due to expiry of associated timer of the SGW 103. The UE context has to be updated in the SGW 103. Thereafter, the SGW 103 retains the connectionless data packet forwarded by the PGW 104 and sends (1302) DDN to the MME 102. The DDN comprises the UE ID for corresponding IMSI and the CL-indication.

Since the UE 100*a* is in idle state, the MME 102 has the context of the UE 100*a*, when the UE 100*a* switched from connected state to idle state. Using the UE context, the MME 102 sends (1303) a page message to all the eNBs in the tracking area (including eNB 101*a*) of the UE 100*a* in steps. The page message comprises the CL indication and UE ID of the UE 100*a* since the eNBs do not maintain UE context in idle state of the UE 100*a*.

On reception of the page message from the MME 102, the eNBs in the tracking area follow the normal idle state paging procedure and send (1304) paging notification to the UE 100*a* for delivery of connectionless data packet as identified from the CL indication in the page message from MME 102.

The idle state UE 100*a* monitors its paging opportunity and receives the paging notification using legacy procedure. Once the idle state UE 100*a* receives the paging notification carrying the CL-indication, the UE 100*a* initiates (1305) RACH procedure till the eNB receives the UE ID from the UE 100*a*. The RACH procedure can be the existing RACH, the modified RACH or the optimized RACH and the like. The UE identification at the eNB 101*a* is complete with the matching of UE ID from UE 100*a* with that received from the MME 102. The eNB 101*a* which identified the UE 100*a* responds (1306) to the SGW 103 with UE ID and its IP address and eNB TEID on the previously established S1 common bearer in a GPRS Tunneling Protocol User (GTP- U) S1 message and requests the SGW 103 to push the connectionless data packet to eNB 101a on the S1 common bearer.

The MME 102 provides the IMSI and UE ID mapping of the UE 100a to the SGW 103 and the SGW 103 swaps the IMSI of the UE 100a to the corresponding UE ID in the connectionless data packets. Thereafter, the SGW 103 forwards (1307) the connectionless data packet (destined for identified UE 100a) as GTP-U PDU to the respective eNB 101a using the updated UE context. The eNB 101a delivers (1308) the connectionless data packet to the UE 100a on the PDSCH addressed by the PDCCH scrambled by either temporary C-RNTI or CL-RNTI.

Figure 14A:
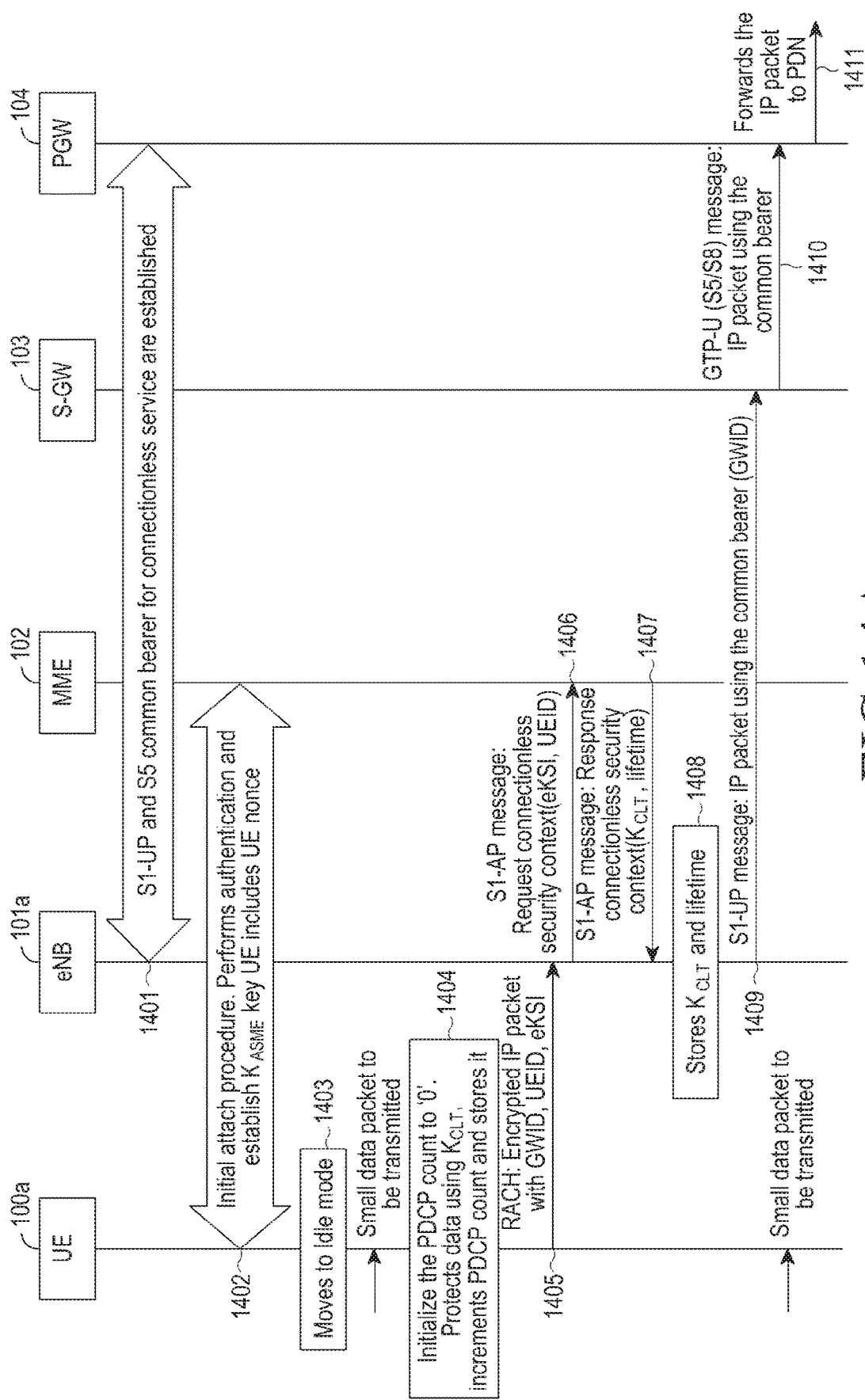
FIGS. 14A and 14B illustrate a new key ($K_{CLT}$) derivation using UE nonce and base key ($K_{ASME}$), according to embodiments as disclosed herein.
Figure 14B:
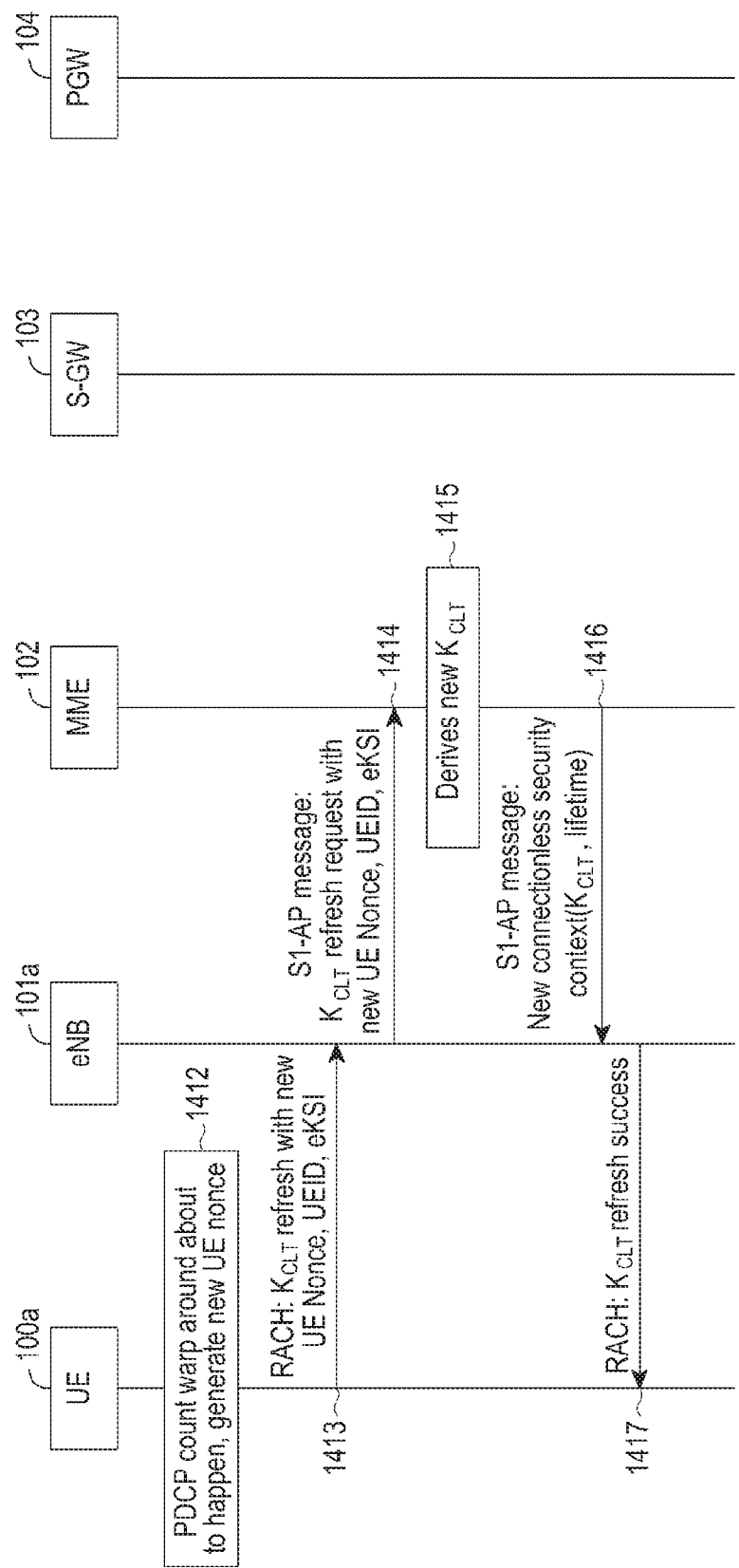

FIGS. 14A and 14B illustrate a new key ($K_{CLT}$) derivation using UE nonce and base key ($K_{ASME}$), according to embodiments as disclosed herein. The figure depicts the UE 100a, the eNB 101a, the MME 102, the SGW 103 and the PGW 104. The MME 102 establishes (1401) the common bearers for the connectionless transmission mode. The S1 common bearer is established between the eNB 101a and the SGW 103. The S5/S8 common bearer is established between the SGW 103 and PGW 104. The eNB 101a is the serving eNB of the UE 101a.

The UE 100a initiates (1402) the initial attach procedure, performs authentication procedure and establishes base key $K_{ASME}$. The MME 102 checks whether the UE 100a is subscribed and/or capable of connectionless transmission. The UE 100a provides the MME with the UE nonce for the new security key $K_{CLT}$ derivation in L3 message. If the UE 100a is authorized and/or capable of connectionless transmission, then the MME 102 and the UE 100a derive the new security key $K_{CLT}$ using UE nonce and the $K_{ASME}$ for connectionless transmission mode. The $K_{CLT}$ derivation using UE nonce is given below:

$K_{CLT}$=KDF $\{K_{ASME}$, UE Nonce$\}$. Key refresh using new UE nonce.

$K_{CLT-int}$ and $K_{CLT-enc}$ are derived in the UE 100a and in the eNB 101a.

The derivation of $K_{CLT-int}$ and $K_{CLT-enc}$ is given below:
$K_{CLT-int}$=KDF $\{C_{CLT}$, Int Alg-ID, CLT-int-alg$\}$
$K_{CLT-enc}$=KDF $\{K_{CLT}$ Enc Alg-ID, CLT-enc-alg$\}$ Once the initial attach procedure is performed and if UE 100a does not have any data to be transferred, the UE 100a switches (1403) to idle state. Further, the UE 100a receives the (small) data packet from the application layers to perform UL transmission using connectionless transmission mode. The UE 100a does not have any AS context; hence the UE 100a initializes (1404) the PDCP COUNT to "0" for the Cell-ID or eNB ID. Then the UE 100a secures the data packet using the $K_{CLT}$. In an another embodiment, securing data packets during connectionless transmission mode between the UE and the eNB 101a is applied using the Access Stratum (AS) security context established during connected state of the UE, wherein the UE and the RAN node maintains the AS security context by caching it and uses it for connectionless transmission also. In this scenario, the $K_{CLT}$ is not derived.

In an embodiment, both integrity protection and encryption are applied to the connectionless data packets. Separate keys are derived from $K_{CLT}$ for confidentiality protection (encryption/decryption) and for integrity protection (for deriving MAC-I).

In an embodiment, same $K_{CLT}$ is used for encryption and integrity protection.

Further, the UE 100a appends (1405) routing information (GW ID) and/or UE identifier (UE ID) to the encrypted data packets as packet header information to independently route the data packets over said modified Uu interface 106 and on established common bearers in the wireless cellular network in a self-sustainable manner.

After the encrypted and/or integrity protected data packets are appended, the UE 100a transmits the data packets using the RACH procedure. The RACH procedure can be the existing contention based RACH, the modified RACH or the optimized RACH or the like.

In an embodiment, the evolved Key Set Identifier (eKSI) is included in the first packet to the eNB, in order to confirm the security context used is the same between the UE and the eNB. After receiving the connectionless data packet from UE 100a, the eNB 101a requests (1406) the MME 102 for the connectionless security context for the UE 100a by sending the UE ID and the eKSI (if received in the connectionless packet) in the S1-AP message. The MME 102 responds (1407) with connectionless security context comprising the $K_{CLT}$, the $K_{CLT}$ lifetime and the selected algorithms for connectionless transmission mode to the eNB 101a in S1-AP message. The eNB 101a stores (1408) the $K_{CLT}$ and its lifetime and starts the timer. The eNB decrypts the data packets, increments the uplink PDCP count, stores the incremented PDCP count and stores eKSI. The eNB 101a also checks the integrity of the packet, if integrity protection is applied by the UE 100a. The UE ID and/or the GW ID appended to data packets is used for data packet forwarding and charging. The eNB 101a resolves the GW ID received in the data packet into IP address of gateways (SGW 103 and/or PGW 104) and the UL TEID. Further, the eNB 101a forwards (1409) the connectionless data packet to the SGW 103 on S1 common bearer with S1-UP message. Further, the SGW 103 forwards (1410) the received data packet to the PGW 104 in GPRS Tunneling protocol-User (GTP-U) S5/S8 message on the S5/S8 common bearer as described at step 1409 and 1410. Then, the PGW 104 forwards (1411) data packet to the PDN port.

Further after several data packets (small) are transmitted and the PDCP count wrap around about to take place, the UE 100a generates (1412) new UE nonce and derives new $K_{CLT}$. The UE 100a initiates the RACH procedure and requests (1413) the eNB 101a to refresh the $K_{CLT}$ using the new UE nonce, UE ID and eKSI. The eNB 101a forwards (1414) the request from UE 100a to the MME 102 in the S1-AP message. The MME derives (1415) new $K_{CLT}$ and sends (1416) new connectionless security context comprising new $K_{CLT}$ and its lifetime to eNB 101a. The eNB informs (1417) the UE 100a about successful Key refresh procedure.

Figure 15A:
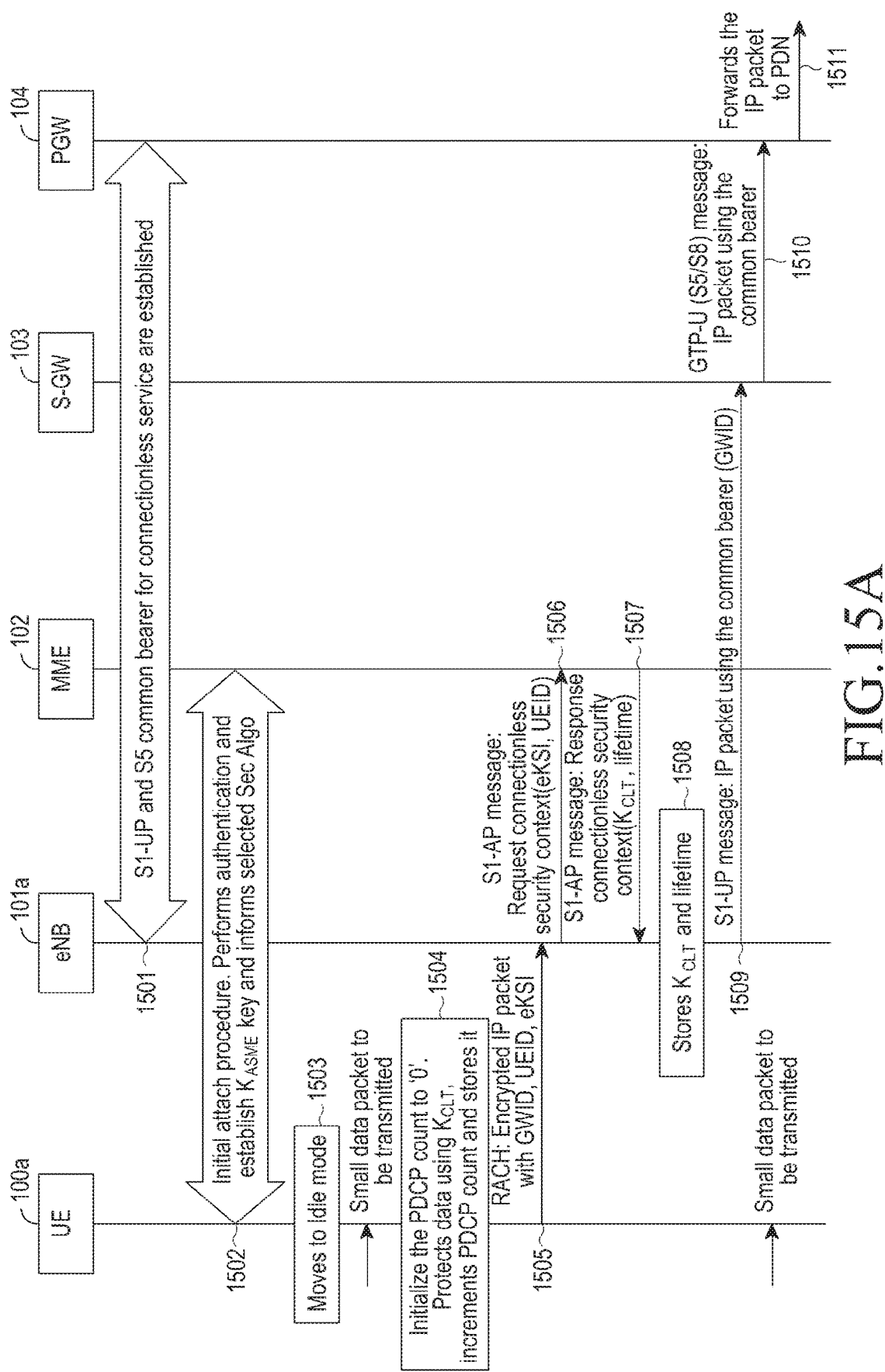
FIGS. 15A and 15B illustrate new key ($K_{CLT}$) derivation using CLT algo ID and $K_{ASME}$, according to embodiments as disclosed herein.
Figure 15B:
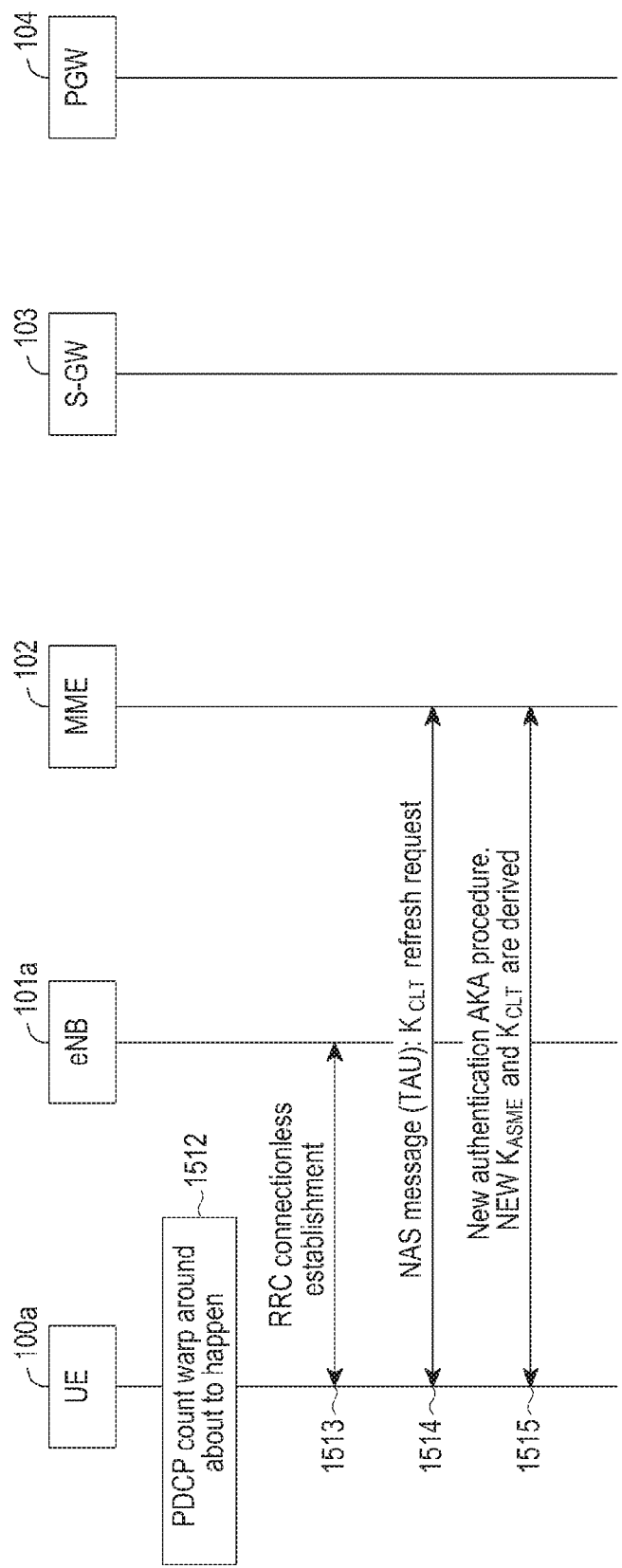

FIGS. 15A and 15B illustrate new key ($K_{CLT}$) derivation using connectionless transmission (CLT) algorithm ID and $K_{ASME}$, according to embodiments as disclosed herein. The figure depicts the UE 100a, the eNB 101a, the MME 102, the SGW 103 and the PGW 104. The MME 102 establishes (1501) the common bearers for the connectionless transmission mode. The S1 common bearer is established between the eNB 101a and the SGW 103. The S5/S8 common bearer is established between the SGW 103 and PGW 104. The eNB 101a is the serving eNB of the UE 101a.

The UE 100a initiates (1502) the initial attach procedure, performs authentication procedure and establishes base key $K_{ASME}$. The MME 102 checks whether the UE 100a is subscribed and/or capable of connectionless transmission. The MME 102 informs the UE 100a the selected security algorithm for connectionless transmission (CLT Algo ID) during NAS Security Mode Command (SMC) procedure or a pre-selected cryptography algorithm. If the UE 100a is authorized and/or capable of connectionless transmission, then the MME 102 and the UE 100a derive the new security key $K_{CLT}$ using CLT Algo ID and the $K_{ASME}$ for connectionless transmission mode. The $K_{CLT}$ derivation using CLT Algo ID is given below:

$K_{CLT}$=KDF {$K_{ASME}$, CLT Algo ID}. Key refresh using new $K_{ASME}$

Once the initial attach procedure is performed and the UE 100a does not have any data to be transferred, the UE 100a switches (1503) to idle state. Further, the UE 100a receives the (small) data packet from the application layers to perform UL transmission using connectionless transmission mode. The UE 100a does not have any AS context; hence the UE 100a initializes (1504) the PDCP COUNT to "0" for the Cell-ID or eNB ID. Then the UE 100a secures the data packet using the $K_{CLT}$.

Further, the UE 100a appends (1505) routing information (GW ID) and UE identifier (UE ID) to the encrypted data packets as packet header information to independently route the data packets over said modified Uu interface 106 and on established common bearers in the wireless cellular network in a self-sustainable manner.

After the encrypted and/or integrity protected data packets are appended, the UE 100a transmits the data packets using the RACH procedure. The RACH procedure can be the existing contention based RACH, the modified RACH or the optimized RACH or the like.

In an embodiment, the evolved Key Set Identifier (eKSI) is included in the first packet to the eNB, in order to confirm the security context used is the same between the UE and the eNB. After receiving the connectionless data packet from UE 100a, the eNB 101a requests (1506) the MME 102 for the connectionless security context for the UE 100a by sending the UE ID and the eKSI (if received in the connectionless packet) in the S1-AP message. The MME 102 responds (1507) with connectionless security context comprising the $K_{CLT}$, the $K_{CLT}$ lifetime and the selected algorithms for connectionless transmission mode to the eNB 101a in S1-AP message. The eNB 101a stores (1508) the $K_{CLT}$ and its lifetime and starts the timer. The eNB decrypts the data packets, increments the uplink PDCP count, stores the incremented PDCP count and stores eKSI. The eNB also checks the integrity of the packet, if integrity protection is applied by the UE. The UE ID and/or the GW ID appended to data packets is used for data packet forwarding and charging. The eNB 101a resolves the GW ID received in the data packet into IP address of SGW 103 and IP address of destined PGW 104. Further, the eNB 101a forwards (1509) the connectionless data packet to the SGW 103 on S1 common bearer with S1-UP message as described in FIGS. 15A and 15B. Further, the SGW 103 forwards (1510) the received data packet to the PGW 104 in GTP-U S5/S8 message on the S5/S8 common bearer as described in FIGS. 15A and 15B. Then, the PGW 104 forwards (1511) (small) data packet to the PDN port.

Further, after several data packets are transmitted and the PDCP count wrap around is about to take (1512) place, the UE 100a establishes (1513) RRC connection and switches to connected state. Once the connection is established with the eNB 101a, the UE 100a sends (1514) NAS message for TAU comprising $K_{CLT}$ refresh request. The MME 102 in response performs new Authentication and Key Agreement (AKA) procedure and derives new $K_{ASME}$ and $K_{CLT}$ and provides it to the eNB 101a. The MME 102 also assigns new security identifier (eKSI). In an embodiment, when the PDCP COUNT is about to wrap-around, the eNB 101a request new keys from the MME 102. Then the MME 102 generates new $K_{CTL}$ as detailed in this disclosure and sends it to the eNB. The eNB 101a then initiate the Key change on the fly procedure with the UE 100a to refresh the keys and provides the necessary parameters to the UE 100a to generate the new $K_{CLT}$.

Figure 16A:
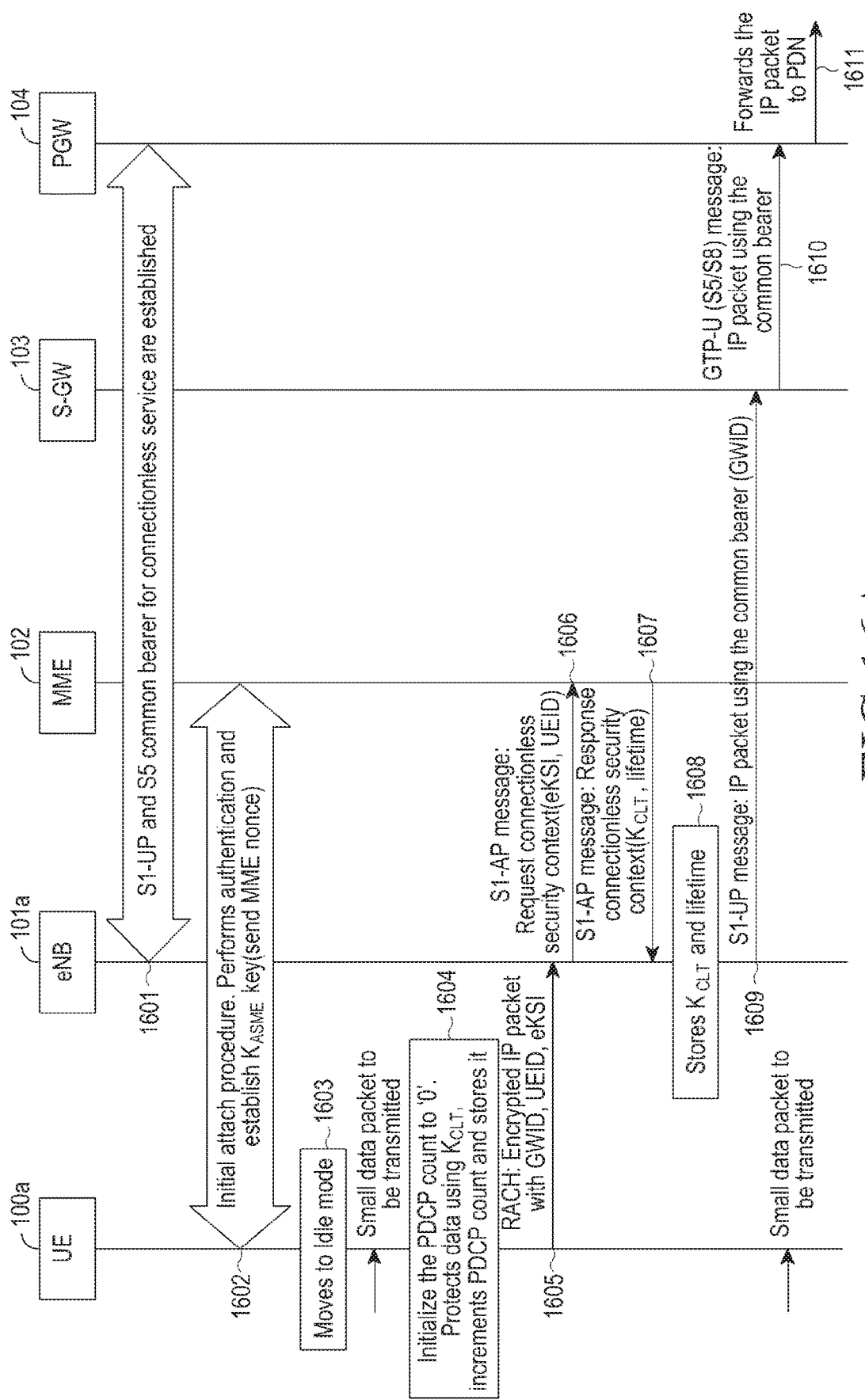
FIGS. 16A and 16B illustrate the new key ($K_{CLT}$) derivation using MME nonce and $K_{ASME}$, according to embodiments as disclosed herein.
Figure 16B:
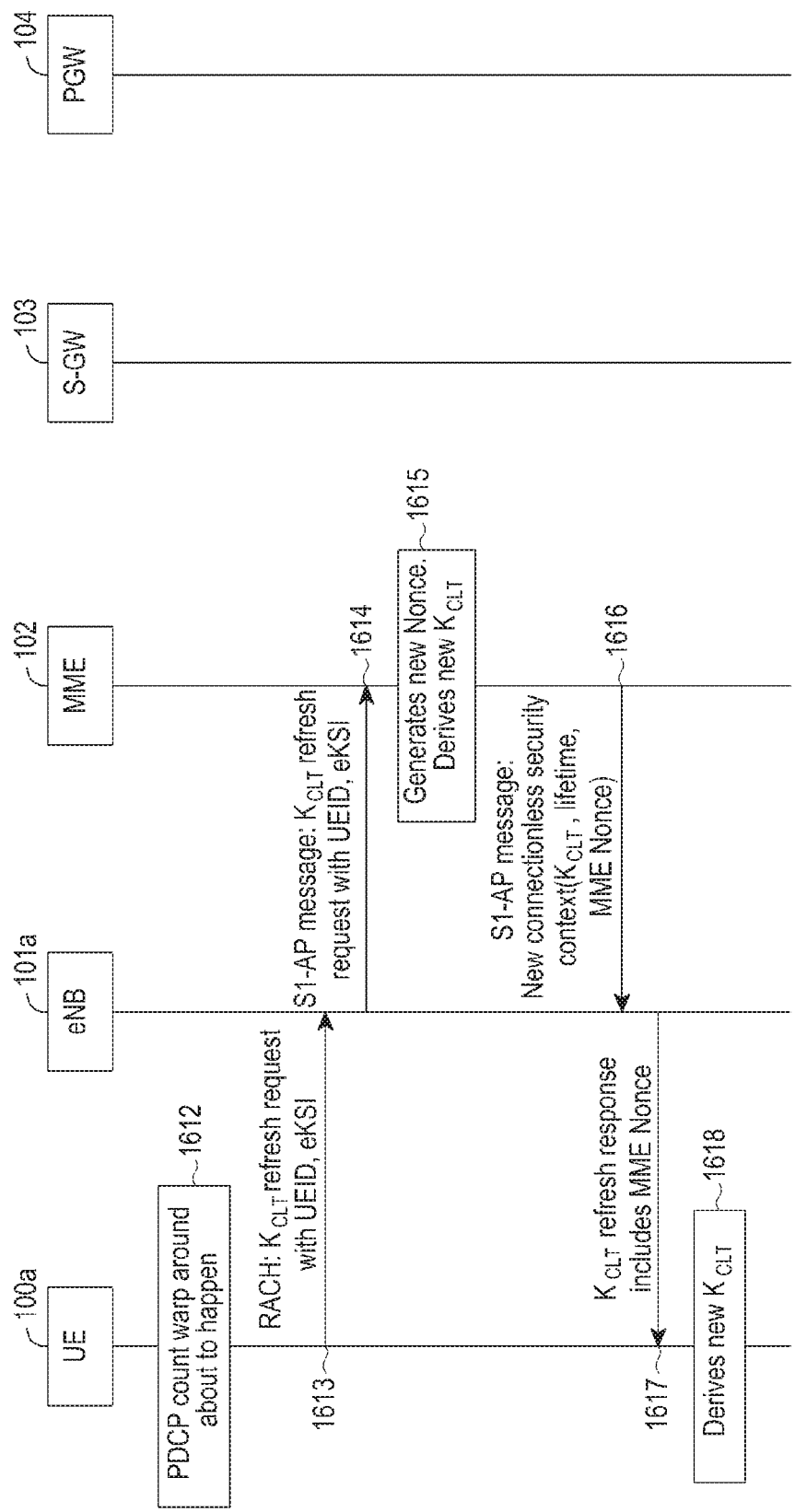

FIGS. 16A and 16B illustrate the new key ($K_{CLT}$) derivation using MME nonce and $K_{ASME}$, according to embodiments as disclosed herein. The figure depicts the UE 100a, the eNB 101a, the MME 102, the SGW 103 and the PGW 104. The MME 102 establishes (1601) the common bearers for the connectionless transmission mode. The S1 common bearer is established between the eNB 101a and the SGW 103. The S5/S8 common bearer is established between the SGW 103 and PGW 104. The eNB 101a is the serving eNB of the UE 101a.

The UE 100a initiates (1602) the initial attach procedure, performs authentication procedure and establishes base key $K_{ASME}$. The MME 102 checks whether the UE 100a is subscripted and/or capable of connectionless transmission. The MME 102 informs the UE 100a the selected security algorithm for connectionless transmission (CLT Algo ID) during NAS Security Mode Command (SMC) procedure and provides the MME nonce. If the UE 100a is authorized and/or capable of connectionless transmission, then the MME 102 and the UE 100a derive the new security key $K_{CLT}$ using MME nonce and the $K_{ASME}$ for connectionless transmission mode. The $K_{CLT}$ derivation using MME nonce is given below:

$K_{CLT}$=KDF {$K_{ASME}$, MME Nonce}. Key refresh using new MME nonce.

$K_{CLT}$ is derived in the UE 100a and in the MME 102. $K_{CLT-int}$ and $K_{CLT-enc}$ are derived in the UE 100a and in the eNB 101a.

The derivation of $K_{CLT-int}$ and $K_{CLT-enc}$ is given below:

$K_{CLT-int}$=KDF {$K_{CLT}$, Int Alg-ID, CLT-int-alg}

$K_{CLT-enc}$=KDF {$K_{CLT}$ Enc Alg-ID, CLT-enc-alg}

Once the initial attach procedure is performed and the UE 100a does not have any data to be transferred, the UE 100a switches (1603) to idle state. Further, the UE 100a receives the (small) data packet from the application layers to perform UL transmission using connectionless transmission mode. The UE 100a does not have any AS context; hence the UE 100a initializes (1604) the PDCP COUNT to "0" for the Cell-ID or eNB ID. Then the UE 100a secures the data packet using the $K_{CLT}$.

In an embodiment, both integrity protection and encryption are applied to the connectionless data packets. Separate keys are derived from $K_{CLT}$ for confidentiality protection (encryption/decryption) and for integrity protection (for deriving MAC-I).

In an embodiment, same $K_{CLT}$ is used for encryption and integrity protection.

Further, the UE 100a appends (1605) routing information (GW ID) and UE identifier (UE ID) to the encrypted data packets as packet header information to independently route the data packets over said modified Uu interface 106 and on established common bearers in the wireless cellular network in a self-sustainable manner.

After the encrypted and/or integrity protected data packets are appended, the UE 100a transmits the data packets using the RACH procedure. The RACH procedure can be the existing contention based RACH, the modified RACH or the optimized RACH or the like.

In an embodiment, the evolved Key Set Identifier (eKSI) is included in the first packet to the eNB, in order to confirm the security context used is the same between the UE and the eNB. After receiving the connectionless data packet from UE 100*a*, the eNB 101*a* requests (1606) the MME 102 for the connectionless security context for the UE 100*a* by sending the UE ID and the eKSI (if received in the connectionless packet) in the S1-AP message. The MME 102 responds (1607) with connectionless security context comprising the $K_{CLT}$, the $K_{CLT}$ lifetime and the selected algorithms for connectionless transmission mode to the eNB 101*a* in S1-AP message. The eNB 101*a* stores (1608) the $K_{CLT}$ and its lifetime and starts the timer. The eNB decrypts the data packets, increments the uplink PDCP count, stores the incremented PDCP count and stores eKSI. The eNB 101*a* also checks the integrity of the data packet, if integrity protection is applied by the UE. The UE ID and the GW ID appended to data packets is used for data packet forwarding and charging. The eNB 101*a* resolves the GW ID received in the data packet into IP address of SGW 103 and/or IP address of destined PGW 104 and/or the UL TEID if any. Further, the eNB 101*a* forwards (1609) the connectionless data packet to the SGW 103 on S1 common bearer with S1-UP message as described in FIGS. 16A and 16B. Further, the SGW 103 forwards (1610) the received data packet to the PGW 104 on the S5/S8 common bearer as described in FIGS. 16A and 16B. Then, the PGW 104 forwards (1611) data packet to the PDN port.

Further after several (small) data packets are transmitted and the PDCP count wrap around about to take (1612) place, the UE 100*a* initiates the RACH procedure and requests (1613) the eNB 101*a* to refresh the $K_{CLT}$ by sending UE ID and eKSI with the request to the eNB 101*a*. The eNB 101*a* forwards (1614) the request from UE 100*a* to the MME 102 in the S1-AP message. The MME derives (1615) new $K_{CLT}$ by generating new MME nonce. Further, the MME 102 sends (1616) new connectionless security context comprising new $K_{CLT}$, its lifetime and MME nonce to eNB 101*a* in S1-AP message. The eNB informs (1617) the UE 100*a* about successful $K_{CLT}$ refresh procedure that comprises MME nonce. On receiving the MME nonce the UE 100*a* derives new $K_{CLT}$.

Figure 17A:
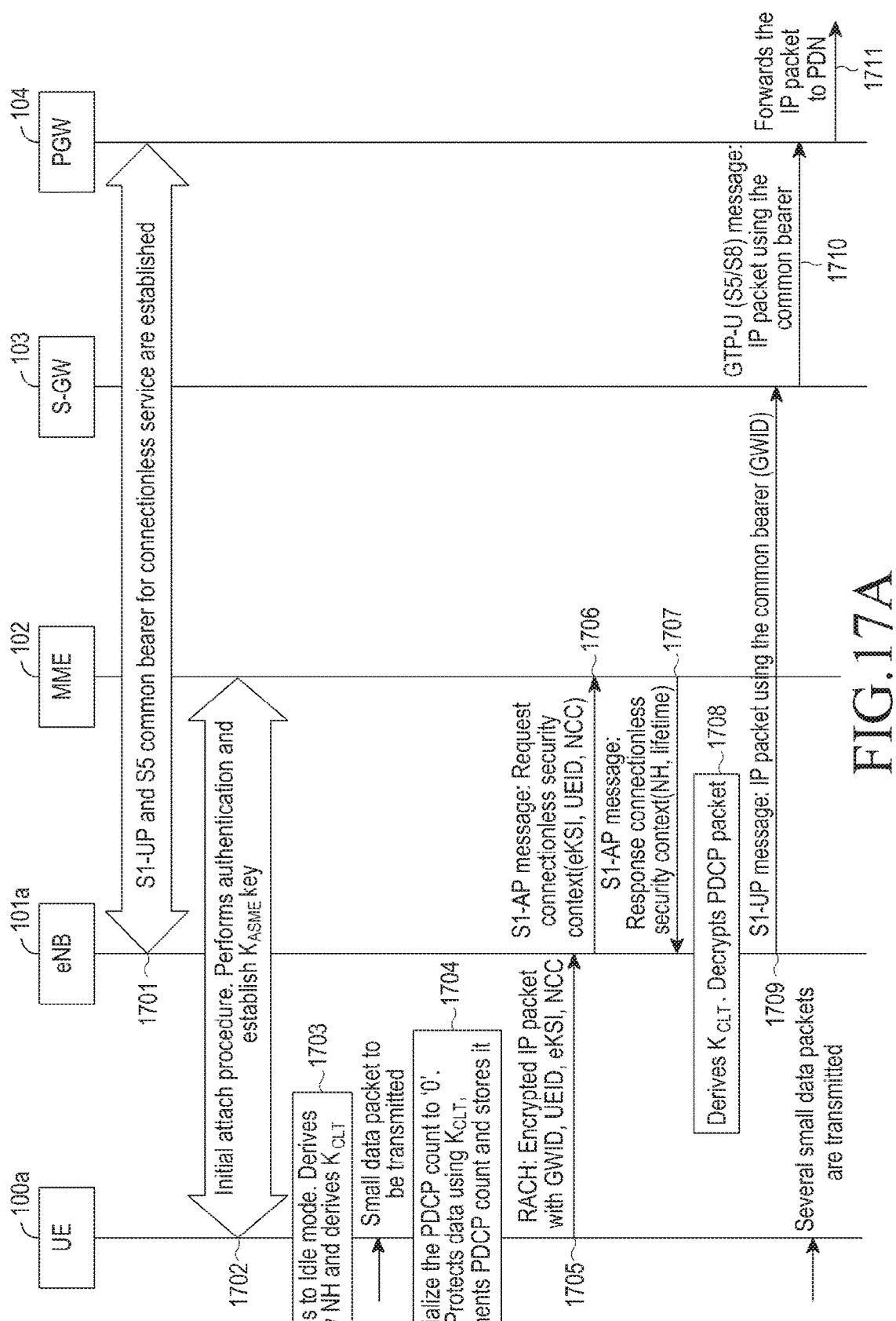
FIGS. 17A and 17B illustrate the new key ($K_{CLT}$) derivation using a base station key ($K_{eNB}$), Next Hop (NH) and $K_{ASME}$, according to embodiments as disclosed herein.
Figure 17B:
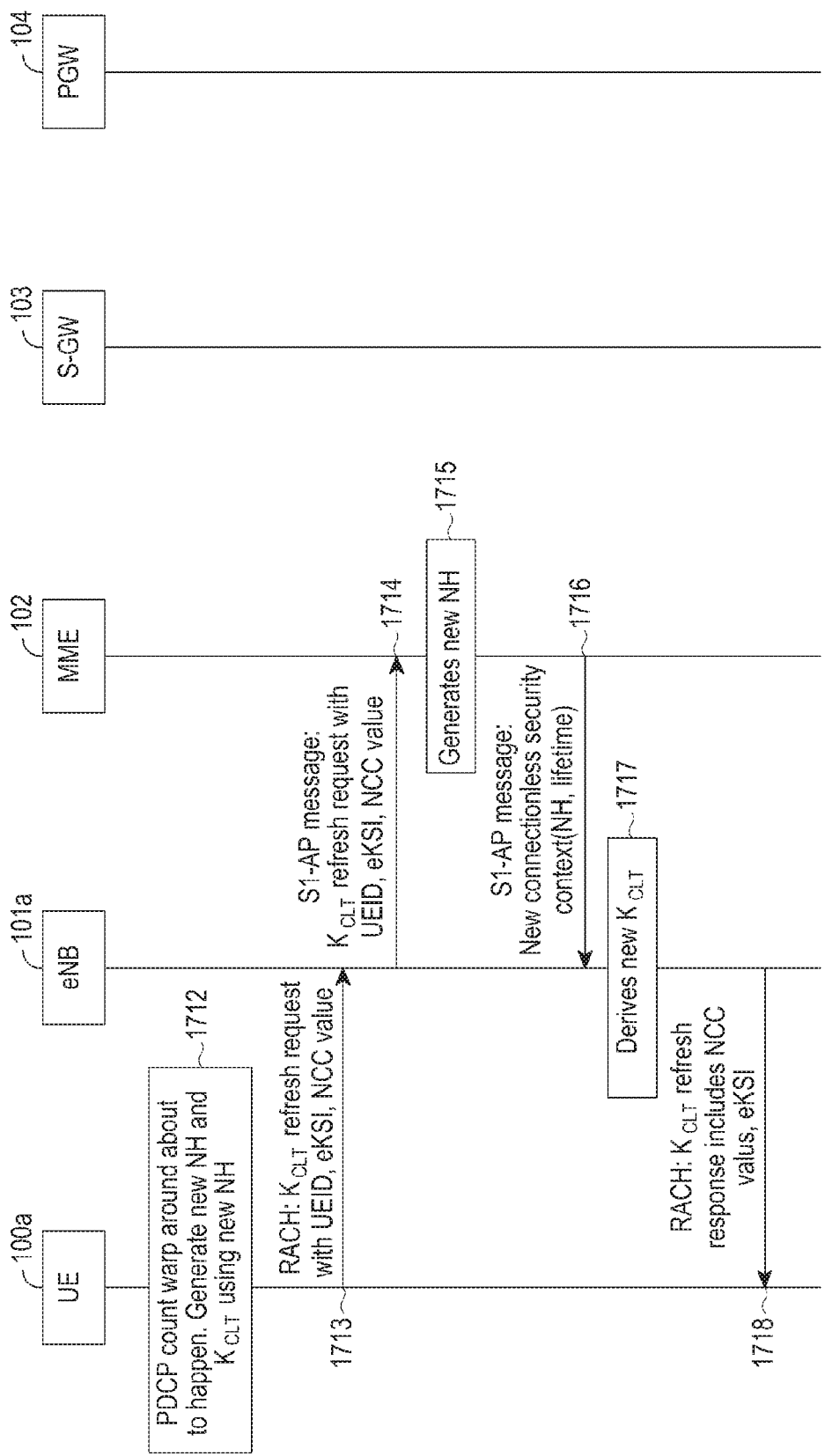

FIGS. 17A and 17B illustrate the new key ($K_{CLT}$) derivation using a base station key ($K_{eNB}$), Next Hop (NH) value and $K_{ASME}$, according to embodiments as disclosed herein. The figure depicts the UE 100*a*, the eNB 101*a*, the MME 102, the SGW 103 and the PGW 104. The MME 102 establishes (1701) the common bearers for the connectionless transmission mode. The S1 common bearer is established between the eNB 101*a* and the SGW 103. The S5/S8 common bearer is established between the SGW 103 and PGW 104. The eNB 101*a* is the serving eNB of the UE 101*a*.

The UE 100*a* initiates (1702) the initial attach procedure, performs authentication procedure and establishes base key $K_{ASME}$. The MME 102 checks whether the UE 100*a* is subscripted and/or capable of connectionless transmission. Once the initial attach procedure is performed and the UE 100*a* does not have any data to be transferred, the UE 100*a* switches (1703) to idle state. If the UE 100*a* is authorized and/or capable of connectionless transmission the UE 100*a* derives new NH value and $K_{CLT}$ in idle state. The $K_{CLT}$ derivation using new NH value AND $K_{eNB}$ is given below:

$$K_{CLT\text{-}int} = KDF \{K_{eNB}/NH, \text{Int Alg-ID, CLT-int-alg}\}$$

$$K_{CLT\text{-}enc} = KDF \{K_{eNB}/NH, \text{Enc Alg-ID, CLT-enc-alg}\}$$

Key refreshing is also done using NH value.

Further, the UE 100*a* receives the (small) data packet from the application layers to perform UL transmission using connectionless transmission mode. The UE 100*a* does not have any AS context; hence the UE 100*a* initializes (1704) the PDCP COUNT to "0" for the Cell-ID or eNB ID. Then the UE 100*a* secures the data packet using the $K_{CLT}$.

In an embodiment, both integrity protection and encryption are applied to the connectionless data packets. Separate keys are derived from $K_{CLT}$ for confidentiality protection (encryption/decryption) and for integrity protection (for deriving MAC-I).

In an embodiment, same $K_{CLT}$ is used for encryption and integrity protection.

Further, the UE 100*a* appends (1705) routing information (GW ID), UE identifier (UE ID) and NCC to the encrypted data packets as packet header information to independently route the data packets over said modified Uu interface 106 and on established common bearers in the wireless cellular network in a self-sustainable manner.

After the encrypted and/or integrity protected and/or integrity protected data packets are appended, the UE 100*a* transmits the data packets using the RACH procedure. The RACH procedure can be the existing contention based RACH, the modified RACH or the optimized RACH or the like.

In an embodiment, the evolved Key Set Identifier (eKSI) is included in the first packet to the eNB, in order to confirm the security context used is the same between the UE and the eNB. After receiving the connectionless data packet from UE 100*a*, the eNB 101*a* requests (1706) the MME 102 for the connectionless security context for the UE 100*a* by sending the UE ID, the eKSI (if received in the connectionless packet) and an NCC (Next hop Chaining Counter) in the S1-AP message. The MME 102 responds (1707) with connectionless security context comprising the NH value and the lifetime to the eNB 101*a* in S1-AP message. The eNB 101*a* derives (1708) the $K_{CLT}$, decrypts the data packets using the $K_{CLT}$, increments the uplink PDCP count, stores the incremented PDCP count and stores eKSI. The eNB 101*a* also checks the integrity of the packet, if integrity protection is applied by the UE. The UE ID and the GW ID appended to data packets is used for data packet forwarding and charging. The eNB 101*a* resolves the GW ID received in the data packet into IP address of SGW 103 and IP address of destined PGW 104. Further, the eNB 101*a* forwards (1709) the connectionless data packet to the SGW 103 on S1 common bearer with S1-UP message as described in FIGS. 17A and 17B. Further, the SGW 103 forwards (1710) the received data packet to the PGW 104 in GTP-U S5/S8 message on the S5/S8 common bearer as described in FIGS. 17A and 17B. Then, the PGW 104 forwards (1711) data packet to the PDN port.

Further after several (small) data packets are transmitted and the PDCP count wrap around about to take (1712) place, the UE 100*a* generates new NH value and derives $K_{CLT}$ using new NH value. Thereafter, the UE 100*a* initiates the RACH procedure and requests (1713) the eNB 101*a* to refresh the $K_{CLT}$ by sending UE ID, eKSI and NCC value with the request to the eNB 101*a*. The eNB 101*a* forwards (1614) the request from UE 100*a* to the MME 102 in the S1-AP message comprising UE ID, eKSI and NCC value. The MME generates (1715) new NH value as specified by TS 33.401 of 3GPP standard. Further, the MME 102 sends (1716) new connectionless security context comprising NH value and, its lifetime to eNB 101*a* in S1-AP message. The eNB derives (1717) new $K_{CLT}$. Further, the eNB 101*a* informs the UE 100*a* about successful $K_{CLT}$ refresh through RACH procedure that comprises NCC values and eKSI. In an embodiment, if $K_{UPenc}$ and $K_{UPint}$ are used for connectionless transmission mode protection, then the MME 102 passes the $K_{eNB}$ derived from the NH value, to the eNB 101a. The eNB 101a derives $K_{UPenc}$ and $K_{UPint}$ from $K_{eNB}$. The MME 102 increases the NCC count for every request from eNB 101a for protection of the connectionless data packets and provide the NCC value to the eNB 101a. Then, eNB 101 sends the NCC value to the UE 100a for derivation of the correct $K_{eNB}$. For connectionless transmission mode protection, every PDCP COUNT wrap-up (wrap around) and cell re-selection are considered as handover.

The method disclosed provides security key handling during cell reselection. The UE 100a and the wireless cellular network always refresh the $K_{CLT}$ key after the cell reselection. The UE 100a deletes all the existing keys during cell reselection and derive new $K_{CLT}$ after cell reselection. In one embodiment, the UE indicate explicitly using an indicator to the network to refresh the keys. The UE includes the explicit indicator along with the parameters needed for Key refresh such as eKSI value, new UE nonce or MME nonce, new NCC value and the like.

In an embodiment, the UE 100a implicitly indicates the wireless cellular network to refresh the key $K_{CLT}$, by including the parameters needed for the Key refresh such as eKSI value, new UE nonce or MME nonce, new NCC value and the like along with the self-sustained packets.

The MME 102 always provides a new key to the eNB 101a, whenever requested.

Integrity and confidential key derivation from $K_{CLT}$

The method disclosed derives the encryption and integrity keys from $K_{CLT}$ are given below:

$K_{CLT-int}$=KDF $\{K_{CLT}, \text{Int Alg-ID, CLT-int-alg}\}$ $K_{CLT-enc}$=KDF $\{K_{CLT}, \text{Enc Alg-ID, CLT-enc-alg}\}$ Int Alg-ID values defined are:
"$0000_2$" EIA0 Null Integrity Protection algorithm
"$0001_2$" 128-EIA1 SNOW 3G
"$0010_2$" 128-EIA2 AES
"$0011_2$" 128-EIA3 ZUC
Enc Alg-ID values defined are:
"$0000_2$" EEA0 Null ciphering algorithm
"$0001_2$" 128-EEA1 SNOW 3G based algorithm
"$0010_2$" 128-EEA2 AES based algorithm
"$0011_2$" 128-EEA3 ZUC based algorithm

TABLE 1

| Algorithm distinguisher | Value |
| --- | --- |
| NAS-enc-alg | 0x01 |
| NAS-int-alg | 0x02 |
| RRC-enc-alg | 0x03 |
| RRC-int-alg | 0x04 |
| UP-enc-alg | 0x05 |
| UP-int-alg | 0x06 |
| CLT-enc-alg | 0x07 |
| CLT-Int-alg | 0x08 |

In an embodiment, securing the data packets in connectionless transmission mode can be between the UE 101a and the SGW 103 is based on derivation of $K_{CLT}$ from the $K_{ASME}$ and $K_{CLT}$ is derived using a negotiated cryptography algorithms in connected state of UE 100a using Security Mode Command (SMC) procedure for connectionless transmission mode, or selected NAS cryptography algorithms in connected state of the UE 100a, or a pre-configured cryptography algorithm for connectionless transmission mode. The $K_{CLT}$ is derived from $K_{ASME}$ by the UE 100a and the MME 102. Further, the MME 102 provides the $K_{CLT}$ and list of selected algorithms to the SGW 103 for handling the security of connectionless transmission traffic in GTP-C message. The $K_{CLT}$ is refreshed using the new UE nonce, the new MME nonce, the new (NH) value and the new $K_{ASME}$ as specified in one of the methods as discussed above.

Figure 18:
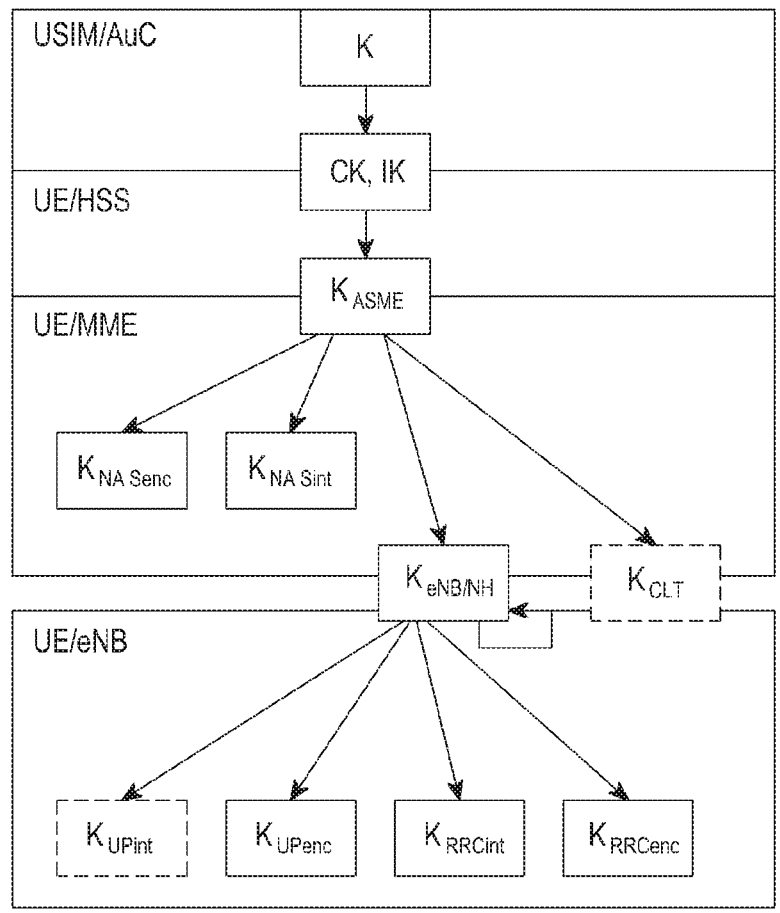
FIG. 18 illustrates key derivation for data packets secured between the UE and eNB, according to embodiments as disclosed herein.

FIG. 18 illustrates key derivation for data packets secured between the UE and eNB, according to embodiments as disclosed herein. The new security key ($K_{CLT}$) for connectionless transmission mode is derived by UE 100a and MME 102 from $K_{ASME}$, as well as an identifier for the integrity algorithm using the key derivation function (KDF) as specified in one of the methods as discussed above.

Figure 19:
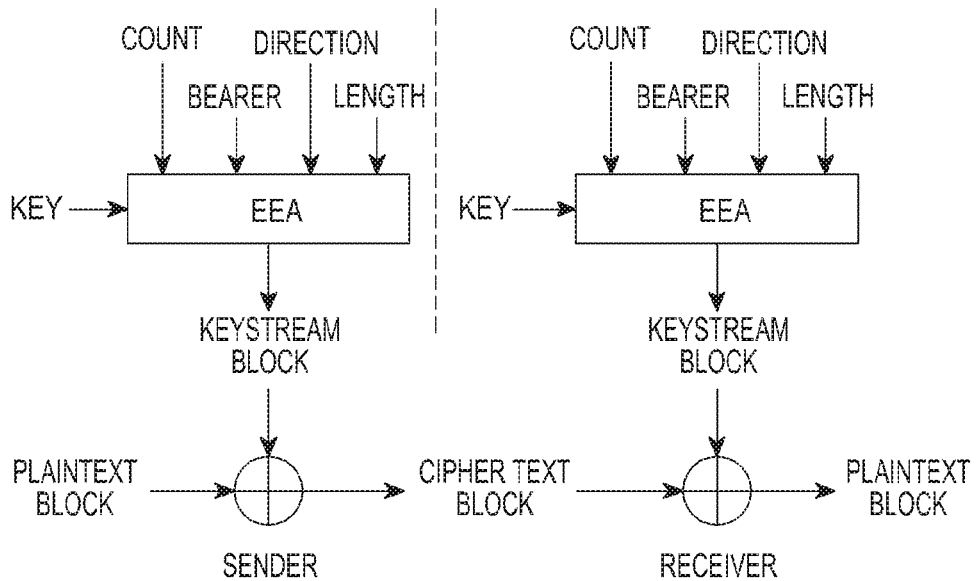
FIG. 19 illustrates an encryption/decryption mechanism with ciphering algorithm, according to embodiments as disclosed herein.

FIG. 19 illustrates an encryption/decryption mechanism with ciphering algorithm, according to embodiments as disclosed herein. The figure depicts the input parameters to the ciphering algorithm EEA that used to encrypt or decrypt the data to be transmitted as packet data. The input parameters comprise the $K_{CLT}$ which is a 128-bit cipher key (KEY), the PDCP count value which is a 32-bit COUNT, a 5-bit bearer identity (BEARER) which is standard value for connectionless transmission mode Radio Bearer (RB) identity, a 1-bit of DIRECTION representing direction of the connectionless transmission mode and. length of the key stream required (LENGTH). The DIRECTION bit is 0 for UL transmission and 1 for DL transmission.

The sender side security mechanism involves encrypting the plain text (data to be transmitted) using the key stream block generated by the EEA algorithm.

The encrypted cipher text block is received by the receiver side and decrypted. The decryption is performed by using sender identical key stream block generated at the receiver using EEA algorithm.

In the existing art, UE is not identified at cell level in idle state at the network. In an embodiment, UE 100a in the idle state is identified at cell level in the wireless cellular network. In order to facilitate this, at cell re-selection UE 100a performs a RACH procedure (for example RACH optimized for CLT), so that the eNB 101a updates the current camped cell of the UE 100a in the MME 102, so that MME 102 can start paging in the current camped cell.

Figure 20:
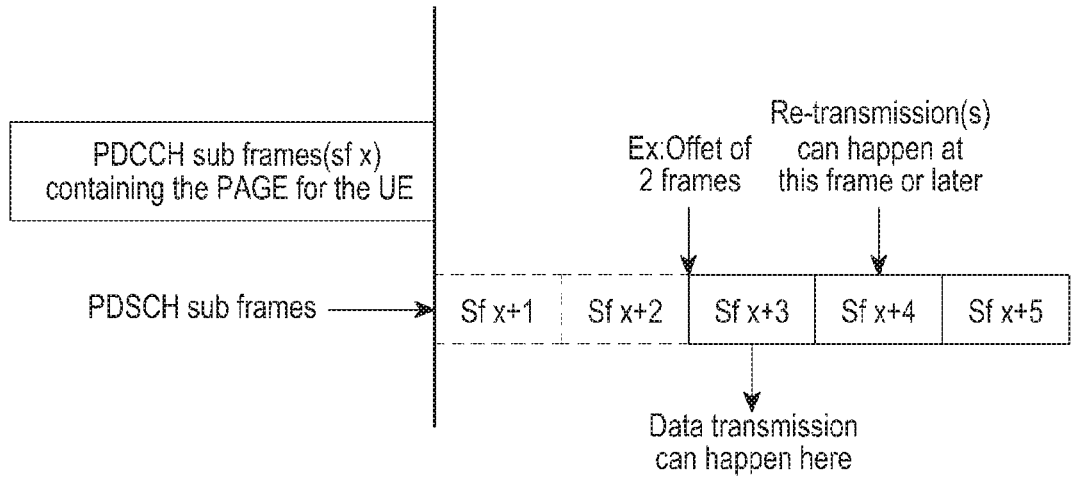
FIG. 20 illustrates the data packets received during the DL transmission in connectionless transmission mode with DL assignment information included in paging, according to embodiments as disclosed herein.

FIG. 20 illustrates the data packets received during the DL transmission in connectionless transmission mode with DL assignment information included in paging when the UE is identified at cell level, according to embodiments as disclosed herein. The figure depicts data packets received at an offset from paging.

The paging notification to the UE 100a comprises the CL-Indication, and the DL assignment and/or the UL grant. The UE 101a uses the DL assignment provided in paging notification to decode PDSCH and acquire the DL data.

In an embodiment, instead of providing DL assignment in page message, DL assignment for the connectionless transmission is pre-configured.

Figure 21:
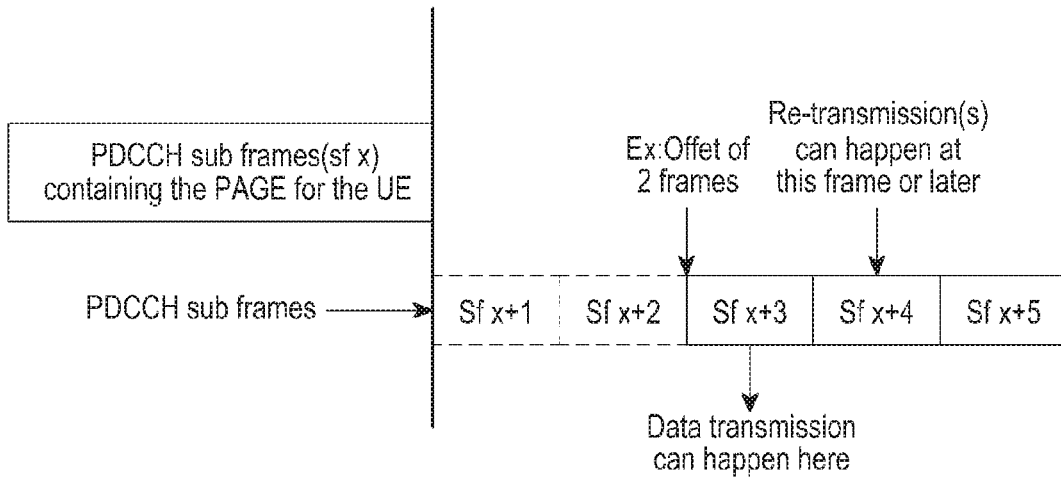
FIG. 21 illustrates the data packets received during the DL transmission in connectionless transmission mode with the CL-RNTI included in paging, according to embodiments as disclosed herein.

FIG. 21 illustrates the data packets received during the DL transmission in connectionless transmission mode with the CL-RNTI included in paging when the UE is identified at cell level, according to embodiments as disclosed herein. The figure depicts data packets received at an offset from paging. The paging notification to the UE 100a comprises the CL-indication and the CL-RNTI (16 bits). The UE 100a uses the CL-RNTI provided in paging notification to decode the PDCCH channel. An offset can be used to identify the time at which the PDCCH is scheduled for the UE 100a. This offset can be with respect to paging occasion of the UE 100a. To avoid HARQ ACK for these data packets, the eNB 101*a* can optionally retransmit the same data packets in subsequent sub frames. In this approach S-RNTI may itself be used for decoding the PDCCH, avoiding CL RNTI in PAGE message.

Figure 22:
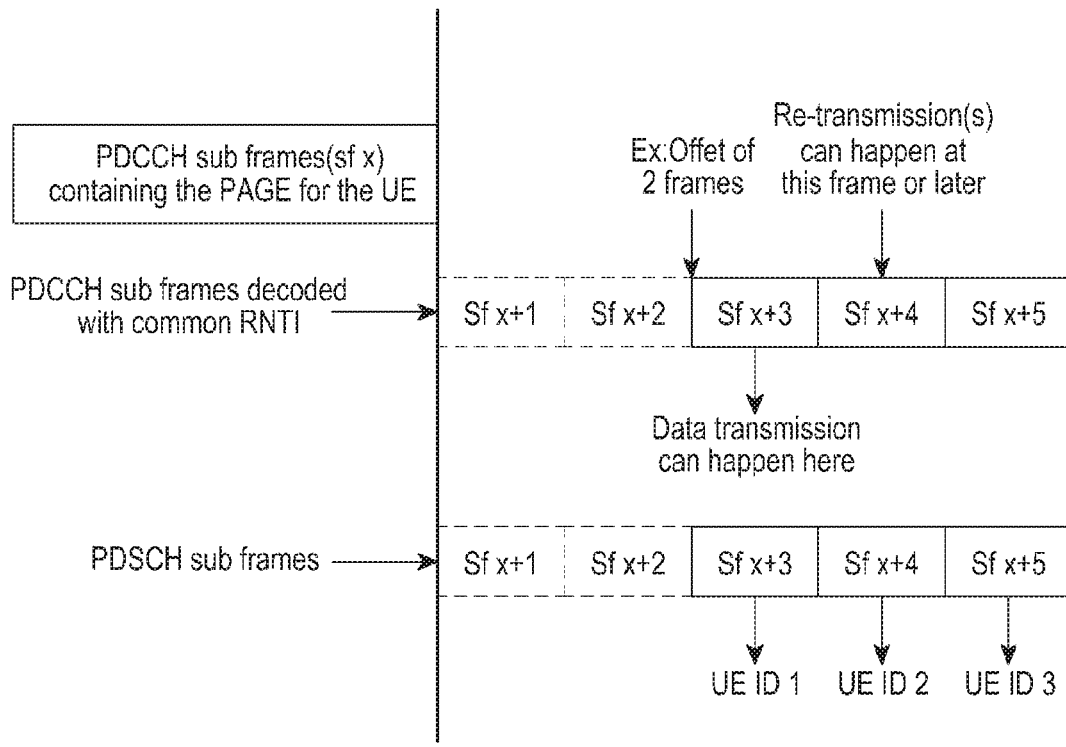
FIG. 22 illustrates the data packets received on common RNTI during the DL transmission in a connectionless transmission mode, according to embodiments as disclosed herein.

FIG. 22 illustrates the data packets received on common RNTI during the DL transmission in connectionless transmission mode when the UE is identified at cell level, according to embodiments as disclosed herein. The figure depicts data packets received at an offset from paging.

The paging notification to the UE 100*a* comprises only CL-indication for the S-TMSI. The eNB 101*a* transmits the connectionless data packets on common resources identified with a common RNTI for all UEs, with UE ID embedded in the data packet. In this approach, at the reception of the paging UE 100*a* starts decoding the PDCCH with common RNTI at an offset and on a pre-defined manner. When a PDCCH is decoded with this common RNTI, UE decodes the data and verifies if the UE ID matches. If UE ID matches, UE 100*a* further applies security to decode the IP packet. In order to avoid HARQ ACK for the data packets the eNB 101*a* can optionally retransmit the same data in subsequent sub frames.

In an embodiment, the paging notification comprises the CL-indication for the S-TMSI and also the data packet. In order to avoid HARQ ACK for this data eNB may optionally retransmit the same data in subsequent sub frames.

In the above described methods, if the eNB 101*a* has further data packets pending for the DL transmission, then eNB 101*a* may indicate the same by adding a field in the data packets, which can be identified by UE 100*a* after decoding. This pending data can be sent at a defined offset in later time.

In an embodiment, some offset for monitoring PDCCH or DRX kind of mechanism for monitoring PDCCH can be applied, to prevent UE 100*a* from monitoring PDCCH continuously.

In another embodiment, connectionless transmission mode can be triggered based on the UE's 100*a* mobility situation. For example, if the UE 100*a* is in low mobility or medium mobility it can be triggered and if UE 100*a* is in high mobility it may not be triggered.

In another embodiment, connectionless transmission mode can be triggered by UE 100*a* after accumulating the data packets that can use connectionless transmission mode. The accumulation can be a threshold value corresponding to time for which data is pending to be transmitted or can be size of pending data in bytes. Such criteria can reduce number of attempts of the UE 100*a* for switching to connectionless transmission mode for every small amount of data.

Handling Mobility for Connection Less Data Delivery:

During UL transmission in connectionless transmission mode, there can be a situation when UE 100*a* has transmitted data packet in RACH message 3 or in any subsequent RACH message a segment of connectionless data packet to Cell #1, and due to mobility UE 100*a* is performing cell re-selection towards cell #2. The method disclosed instructs the UE 100*a* to remain in Cell #1 for Tre-selection period. The pending segment of connectionless data packet can be transmitted to Cell #1 if Tre-selection timer is running and UL grant is given by Cell #1 for pending segment. If the Tre-selection timer expires, then UE 100*a* re-transmits all segments sent to Cell #1 to Cell #2 and subsequent segments to cell #2 after reselection to Cell #2. The eNB 101*a* handling Cell #1 just drops the segment of the connectionless packet sent by UE 100*a* whereas eNB 101*a* handling Cell #2 sends all the segments of connectionless packet to the SGW 103.

During DL transmission of data packets in connectionless transmission mode, the eNB 101*a* can have more than one data packet to be delivered to UE 100*a* or the data packets may get segmented. But if the UE 100*a* changes cells before transmitting all the segments or all the data packets, there may be a loss of data.

In an embodiment, to handle DL data packet delivery with mobility the eNB 101*a* always transmits the entire data packet (IP packet) and avoids segmentation for DL delivery of data packet. The eNB puts a pending indicator in DL data packet and using the pending indicator the UE 100*a* handles mobility.

After the start of DL transmission of data packets if the data packets are either segmented or if the DL data has a pending indicator, UE 100*a* avoids cell reselection until connectionless data is completed.

In another embodiment, UE 100*a* handles the Tre-selection timer as follows:

If Tre-selection expires while during transmission or reception of connectionless data UE 100*a* holds cell reselection process immediately but continues with DL or UL transmission of the data packets. Then, after the completion of UL or DL transmission the UE 100*a* proceeds for cell reselection.

While Tre-selection timer is running if UL or DL transmission of data packets is in progress the UE 100*a* does not count the duration of data packet transmission or reception as part of Tre-selection.

RLC Mode for CL Data Delivery:

As connectionless transmission mode can be used for background kind of data packets RLC can be operated in unacknowledged mode, avoiding ACK/NACKs at RLC layer.

If some high priority data need to be handled which needs reliable delivery even at RLC level, then the RLC can be operated in acknowledged mode.

Indication of Connectionless Data Packets Availability to the Wireless Cellular Network:

In an embodiment, when UE 100*a* has connectionless data packets to be sent to wireless cellular network during UL transmission the UE 100*a* triggers RACH procedure carrying the UE-ID or some notification procedure like SR (scheduling Request) identifying the UE 100*a*. This procedure can be used by eNB 101*a* to get aware that a particular UE has data packets to be sent for UL transmission. Then, the, eNB 101*a*, based on its load or paging occasion, starts the connectionless data exchange by initiating paging for the respective UE 100*a*. In this case, the number of RACH procedures or SRs to eNB 101*a* before eNB 101*a* sends a PAGE to UE 100*a* can be limited.

In another embodiment common resources can be used by the UE 100*a* for indicating the availability of connectionless data packets by sending the UE 100*a* identity to eNB 101*a* using the common resources.

Common Resource for Connectionless Data Packets:

In an embodiment, during UL transmission the eNB 101*a* allocates UL resource for common usage for the purpose of connectionless data transmission. The UE 100*a* transmits connectionless data packet in this common UL resource using a special preamble and carries information about the UE identity such as S-TMSI. The common UL resource is susceptible for collisions when more than one UE transmit in the common UL resource simultaneously.

In an embodiment, during DL transmission the eNB 101*a* uses common resource for delivery of connectionless data packets. In this approach, all the UEs supporting connectionless transmission mode can use a common RNTI to decode the PDCCH for common resources. This PDCCH decode with common RNTI can happen when the earlier paging occasion to the UE 100*a* indicated that there are connectionless data packets for the UE 100*a*. In the common resources UL and or DL transmission in connectionless transmission mode can be carried in one of the following ways.

The UE 100*a* in the common resources can be identified by including the S-TMSI in the data packet, or Common resources can have a header including the UE ID such as S-TMSI and the corresponding offset for the corresponding data packet.

The embodiments disclosed herein can be implemented through at least one software program running on at least one hardware device and performing network management functions to control the elements. The elements shown in FIGS. 1-4, 8-17 and 19 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for transmitting a message by a user equipment (UE) in a network, the method comprising:
   transmitting, by the UE, to a radio access network (RAN) node, a random access channel (RACH) message including identifier information for identifying a serving gateway in a core network;
   receiving, by the UE, from the RAN node, a random access (RA) response message including uplink (UL) grant information; and
   transmitting, by the UE, to the RAN node, a data message including encrypted data in an idle mode,
   wherein the data message is transmitted from the RAN node to the serving gateway based on the identifier information, and
   wherein the encrypted data is generated by the UE, and the encrypted data is decrypted by the serving gateway.

2. The method of claim 1, wherein the RACH message further includes a connectionless mode indication, and
   wherein the RA response message further includes an identifier of the UE.

3. The method of claim 1, wherein the data message further includes a security header for checking integrity protection of the data message.

4. The method of claim 1, wherein the data message is generated, if the UE is in the idle mode and has data to be encrypted to transmit.

5. The method of claim 1, further comprising establishing, by the UE, a security context between the UE and the serving gateway,
   wherein the security context is established in one of an attach procedure and a tracking area update (TAU) procedure, and
   wherein the data message is transmitted, from the UE, to the serving gateway, through the RAN node, based on the security context.

6. A user equipment (UE) in a network, the UE comprising:
   a transceiver; and
   at least one processor configured to control the transceiver to:
   transmit, to a radio access network (RAN) node, a random access channel (RACH) message including identifier information for identifying a serving gateway in a core network,
   receive, from the RAN node, a random access (RA) response message including uplink (UL) grant information, and
   transmit, to the RAN node, a data message including encrypted data in an idle mode,
   wherein the data message is transmitted from the RAN node to the serving gateway based on the identifier information, and
   wherein the encrypted data is generated by the UE, and the encrypted data is decrypted by the serving gateway.

7. The UE of claim 6, wherein the RACH message further includes a connectionless mode indication, and
   wherein the RA response message further includes an identifier of the UE.

8. The UE of claim 6, wherein the data message further includes a security header for checking integrity protection of the data message.

9. The UE of claim 6, wherein the data message is generated, if the UE is in the idle mode and has data to be encrypted to transmit.

10. The UE of claim 6, wherein the at least one processor is further configured to establish a security context between the UE and the serving gateway,
    wherein the security context is established in one of an attach procedure and a tracking area update (TAU) procedure, and
    wherein the data message is transmitted, from the UE, to the serving gateway, through the RAN node, based on the security context.

11. A method for receiving a message by a radio access network (RAN) node in a network, the method comprising:
    receiving, by the RAN node, from a user equipment (UE), a random access channel (RACH) message including identifier information for identifying a serving gateway in a core network;
    transmitting, by the RAN node, to the UE, a random access (RA) response message including uplink (UL) grant information;
    receiving, by the RAN node, from the UE in an idle mode, a data message including encrypted data;
    identifying, by the RAN node, the serving gateway based on the identifier information; and
    transmitting, by the RAN node, to the serving gateway, the data message,
    wherein the encrypted data is generated by the UE, and the encrypted data is decrypted by the serving gateway.

12. The method of claim 11, wherein the RACH message further includes a connectionless mode indication, and
    wherein the RA response message further includes an identifier of the UE.

13. The method of claim 11, wherein the data message further includes a security header for checking integrity protection of the data message.

14. The method of claim 11, wherein the data message is generated, if the UE is in the idle mode and has data to be encrypted to transmit.

15. The method of claim 11, wherein a security context for transmission of the connectionless data between the UE and a serving gateway in a core network is established in one of an attach procedure and a tracking area update (TAU) procedure, and wherein the data message is transmitted from the UE to the serving gateway through the RAN node based on the security context.

16. A radio access network (RAN) node in a network, the RAN node comprising:

a transceiver; and at least one processor configured to:

control the transceiver to:

receive, from a user equipment (UE), a random access channel (RACH) message including identifier information for identifying a serving gateway in a core network, transmit, to the UE, a random access (RA) response message including uplink (UL) grant information, and receive, from the UE in an idle mode, a data message including encrypted data, identify the serving gateway based on the identifier information, and control the transceiver to transmit, to the serving gateway, the data message, wherein the encrypted data is generated by the UE, and the encrypted data is decrypted by the serving gateway.

17. The RAN node of claim 16, wherein the RACH message further includes a connectionless mode indication, and wherein the RA response message further includes an identifier of the UE.

18. The RAN node of claim 16, wherein the data message further includes a security header for checking integrity protection of the data message.

19. The RAN node of claim 16, wherein the data message is generated, if the UE is in the idle mode and has data to be encrypted to transmit.

20. The RAN node of claim 16, wherein a security context for transmission of the connectionless data between the UE and a serving gateway in a core network is established in one of an attach procedure and a tracking area update (TAU) procedure, and wherein the data message is transmitted from the UE to the serving gateway through the RAN node based on the security context.

* * * * *